United States Patent
Gupta et al.

(10) Patent No.: US 11,496,954 B2
(45) Date of Patent: Nov. 8, 2022

(54) METHODS, SYSTEMS, AND COMPUTER READABLE MEDIA FOR SUPPORTING MULTIPLE PREFERRED LOCALITIES FOR NETWORK FUNCTION (NF) DISCOVERY AND SELECTION PROCEDURES

(71) Applicant: Oracle International Corporation, Redwood Shores, CA (US)

(72) Inventors: Nitin Gupta, Bangalore (IN); Anup Shivarajapura, Bangalore (IN); Raghuvamshi vasudev Singh Thakur, Bangalore (IN); Venkatesh Aravamudhan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/200,777

(22) Filed: Mar. 13, 2021

(65) Prior Publication Data

US 2022/0295384 A1    Sep. 15, 2022

(51) Int. Cl.
*H04W 8/12* (2009.01)
*H04W 48/16* (2009.01)
(Continued)

(52) U.S. Cl.
CPC ............. *H04W 48/16* (2013.01); *H04W 8/12* (2013.01); *H04W 60/00* (2013.01); *H04W 88/06* (2013.01)

(58) Field of Classification Search
CPC ....... H04W 48/16; H04W 8/12; H04W 60/00; H04W 88/06
See application file for complete search history.

(56) References Cited

U.S. PATENT DOCUMENTS

| 5,381,413 A | 1/1995 | Tobagi et al. |
| 6,014,558 A | 1/2000 | Thomas |

(Continued)

FOREIGN PATENT DOCUMENTS

| CN | 105635345 B | 2/2019 |
| CN | 109788078 A | 5/2019 |

(Continued)

OTHER PUBLICATIONS

Commonly-assigned, co-pending U.S. Appl. No. 17/485,284 for Methods, Systems and Computer Readable Media for Providing Priority Resolver for Resolving Priorities and Network Function (NF) Instances (Unpublished, filed Sep. 24, 2021).

(Continued)

*Primary Examiner* — Julio R Perez
(74) *Attorney, Agent, or Firm* — Jenkins, Wilson, Taylor & Hunt, P.A.

(57) ABSTRACT

A method for supporting multiple locations in a preferred-locality attribute NF discovery and selection includes receiving, from producer NFs, NF registration messages including NF profiles with locality attributes and registering the producer NFs by storing the NF profiles including the locality attributes in an NF registration database local to an NRF. The method further includes receiving, from a requesting NF, an NF discovery request having query parameters for discovering producer NFs, the query parameters including a preferred-locality attribute identifying a plurality of different preferred producer NF locations. The method further includes retrieving NF profiles from the NF registration database having locality attributes that match any of the preferred producer NF locations. The method further includes generating an NF discovery response including the NF profiles retrieved from the NF registration database. The (Continued)

method further includes forwarding the NF discovery response to the requesting NF.

20 Claims, 12 Drawing Sheets

(51) Int. Cl.
*H04W 60/00* (2009.01)
*H04W 88/06* (2009.01)

(56) References Cited

U.S. PATENT DOCUMENTS

| | | | |
|---|---|---|---|
| 6,748,435 | B1 | 6/2004 | Wang et al. |
| 7,782,776 | B2 | 8/2010 | Shankar et al. |
| 8,023,482 | B2 | 9/2011 | Gong et al. |
| 8,300,637 | B1 | 10/2012 | Bennett, III et al. |
| 8,645,565 | B2 | 2/2014 | Sparks et al. |
| 8,811,228 | B2 | 8/2014 | Lopez et al. |
| 8,879,431 | B2 | 11/2014 | Ridel et al. |
| 8,954,080 | B2 | 2/2015 | Janakiraman et al. |
| 9,124,537 | B2 | 9/2015 | Kolze |
| 9,246,762 | B1 | 1/2016 | Watkins |
| 9,667,590 | B2 | 5/2017 | Yan et al. |
| 10,097,504 | B2 | 10/2018 | Backholm |
| 10,285,155 | B1 | 5/2019 | Dodd-Noble et al. |
| 10,299,128 | B1 | 5/2019 | Suthar et al. |
| 10,313,362 | B2 | 6/2019 | Ahuja et al. |
| 10,361,843 | B1 | 7/2019 | Suthar et al. |
| 10,595,256 | B1 | 3/2020 | Marupaduga et al. |
| 10,609,154 | B2 | 3/2020 | Talebi Fard et al. |
| 10,609,530 | B1 | 3/2020 | Patil et al. |
| 10,616,934 | B2 | 4/2020 | Talebi Fard et al. |
| 10,637,753 | B1* | 4/2020 | Taft ................. H04L 41/04 |
| 10,652,098 | B2 | 5/2020 | Kim |
| 10,772,062 | B1 | 9/2020 | Albasheir et al. |
| 10,778,527 | B2 | 9/2020 | Assali et al. |
| 10,791,044 | B1 | 9/2020 | Krishan et al. |
| 10,819,636 | B1 | 10/2020 | Goel |
| 10,880,370 | B2 | 12/2020 | Seenappa et al. |
| 11,109,307 | B2 | 8/2021 | Bartolome Rodrigo et al. |
| 11,271,846 | B2 | 3/2022 | Krishan |
| 2003/0174649 | A1 | 9/2003 | Shankar et al. |
| 2003/0223414 | A1 | 12/2003 | Wong |
| 2004/0003069 | A1 | 1/2004 | Wong |
| 2004/0141473 | A1 | 7/2004 | Buot |
| 2004/0208183 | A1 | 10/2004 | Balachandran et al. |
| 2005/0181776 | A1* | 8/2005 | Verma ................. H04L 67/04 455/418 |
| 2005/0193096 | A1 | 9/2005 | Yu et al. |
| 2006/0010224 | A1 | 1/2006 | Sekar et al. |
| 2007/0050331 | A1 | 3/2007 | Bauman et al. |
| 2007/0242738 | A1 | 10/2007 | Park et al. |
| 2008/0101293 | A1* | 5/2008 | Woo ................. H04M 1/72403 370/331 |
| 2009/0055835 | A1 | 2/2009 | Zhu |
| 2009/0141625 | A1 | 6/2009 | Ghai et al. |
| 2009/0222584 | A1 | 9/2009 | Josefsberg et al. |
| 2011/0078674 | A1 | 3/2011 | Ershov |
| 2011/0202604 | A1 | 8/2011 | Craig et al. |
| 2013/0029708 | A1 | 1/2013 | Fox et al. |
| 2013/0039176 | A1 | 2/2013 | Kanode et al. |
| 2013/0198269 | A1 | 8/2013 | Fleischman et al. |
| 2013/0272123 | A1 | 10/2013 | Lee et al. |
| 2014/0040975 | A1* | 2/2014 | Raleigh ................. H04L 12/1435 726/1 |
| 2014/0379901 | A1 | 12/2014 | Tseitlin et al. |
| 2015/0016266 | A1 | 1/2015 | Dumitrescu et al. |
| 2015/0071074 | A1 | 3/2015 | Zaidi et al. |
| 2015/0263987 | A1 | 9/2015 | Klein et al. |
| 2016/0142324 | A1 | 5/2016 | Vihtari et al. |
| 2016/0156513 | A1* | 6/2016 | Zhang ................. H04L 41/5041 709/220 |
| 2016/0164788 | A1 | 6/2016 | Goel et al. |
| 2016/0234119 | A1 | 8/2016 | Zaidi et al. |
| 2016/0315743 | A1 | 10/2016 | Nagaraj et al. |
| 2016/0350683 | A1 | 12/2016 | Bester et al. |
| 2016/0352588 | A1 | 12/2016 | Subbarayan et al. |
| 2016/0380906 | A1* | 12/2016 | Hodique ................. H04L 67/1023 709/226 |
| 2017/0221015 | A1 | 8/2017 | June et al. |
| 2018/0039494 | A1 | 2/2018 | Lander et al. |
| 2018/0083882 | A1 | 3/2018 | Krishan et al. |
| 2018/0159780 | A1 | 6/2018 | Essigmann et al. |
| 2018/0183724 | A1 | 6/2018 | Callard et al. |
| 2018/0213391 | A1 | 7/2018 | Inoue |
| 2018/0262592 | A1 | 9/2018 | Zandi et al. |
| 2018/0262625 | A1 | 9/2018 | McCarley et al. |
| 2018/0285794 | A1 | 10/2018 | Gray-Donald et al. |
| 2018/0324247 | A1 | 11/2018 | Hood et al. |
| 2018/0324646 | A1 | 11/2018 | Lee et al. |
| 2018/0343567 | A1 | 11/2018 | Ashrafi |
| 2019/0007366 | A1* | 1/2019 | Voegele ................. H04L 61/4511 |
| 2019/0045351 | A1 | 2/2019 | Zee et al. |
| 2019/0075552 | A1 | 3/2019 | Yu et al. |
| 2019/0116486 | A1 | 4/2019 | Kim et al. |
| 2019/0116521 | A1 | 4/2019 | Qiao et al. |
| 2019/0140895 | A1 | 5/2019 | Ennis, Jr. et al. |
| 2019/0158364 | A1 | 5/2019 | Zhang et al. |
| 2019/0173740 | A1 | 6/2019 | Zhang et al. |
| 2019/0174561 | A1 | 6/2019 | Sivavakeesar |
| 2019/0182875 | A1 | 6/2019 | Talebi Fard et al. |
| 2019/0191348 | A1 | 6/2019 | Futaki et al. |
| 2019/0191467 | A1 | 6/2019 | Dao et al. |
| 2019/0222633 | A1 | 7/2019 | Howes et al. |
| 2019/0223093 | A1 | 7/2019 | Watfa et al. |
| 2019/0230556 | A1 | 7/2019 | Lee |
| 2019/0261244 | A1 | 8/2019 | Jung et al. |
| 2019/0268270 | A1 | 8/2019 | Fattah |
| 2019/0306251 | A1 | 10/2019 | Talebi Fard et al. |
| 2019/0306907 | A1 | 10/2019 | Andreoli-Fang et al. |
| 2019/0313236 | A1 | 10/2019 | Lee et al. |
| 2019/0313437 | A1 | 10/2019 | Jung et al. |
| 2019/0313469 | A1 | 10/2019 | Karampatsis et al. |
| 2019/0335002 | A1 | 10/2019 | Bogineni et al. |
| 2019/0335534 | A1 | 10/2019 | Atarius et al. |
| 2019/0342229 | A1 | 11/2019 | Khinvasara et al. |
| 2019/0342921 | A1 | 11/2019 | Loehr et al. |
| 2019/0349901 | A1 | 11/2019 | Basu Mallick et al. |
| 2019/0357092 | A1 | 11/2019 | Jung et al. |
| 2019/0380031 | A1 | 12/2019 | Suthar et al. |
| 2019/0394284 | A1* | 12/2019 | Baghel ................. H04L 67/60 |
| 2019/0394624 | A1 | 12/2019 | Karampatsis et al. |
| 2019/0394833 | A1 | 12/2019 | Talebi Fard et al. |
| 2020/0007632 | A1 | 1/2020 | Landais et al. |
| 2020/0008069 | A1 | 1/2020 | Zhu et al. |
| 2020/0028920 | A1 | 1/2020 | Livanos et al. |
| 2020/0045753 | A1 | 2/2020 | Dao et al. |
| 2020/0045767 | A1 | 2/2020 | Velev et al. |
| 2020/0053670 | A1 | 2/2020 | Jung et al. |
| 2020/0053724 | A1 | 2/2020 | MolavianJazi et al. |
| 2020/0053828 | A1 | 2/2020 | Bharatia et al. |
| 2020/0059420 | A1 | 2/2020 | Abraham |
| 2020/0059856 | A1 | 2/2020 | Cui et al. |
| 2020/0084663 | A1 | 3/2020 | Park et al. |
| 2020/0092423 | A1 | 3/2020 | Qiao et al. |
| 2020/0092424 | A1 | 3/2020 | Qiao et al. |
| 2020/0106812 | A1 | 4/2020 | Verma et al. |
| 2020/0127916 | A1 | 4/2020 | Krishan |
| 2020/0136911 | A1 | 4/2020 | Assali et al. |
| 2020/0137174 | A1 | 4/2020 | Stammers et al. |
| 2020/0177629 | A1 | 6/2020 | Hooda et al. |
| 2020/0305033 | A1 | 9/2020 | Keller et al. |
| 2020/0313996 | A1 | 10/2020 | Krishan et al. |
| 2020/0314615 | A1 | 10/2020 | Patil et al. |
| 2020/0336554 | A1 | 10/2020 | Deshpande et al. |
| 2020/0404608 | A1 | 12/2020 | Albasheir et al. |
| 2020/0412597 | A1 | 12/2020 | Goel et al. |
| 2021/0007023 | A1 | 1/2021 | Umapathy et al. |
| 2021/0044481 | A1 | 2/2021 | Xu et al. |
| 2021/0067480 | A1 | 3/2021 | Goel |
| 2021/0067485 | A1 | 3/2021 | Goel |
| 2021/0105214 | A1 | 4/2021 | Goel |
| 2021/0168055 | A1 | 6/2021 | Lair |

(56) References Cited

U.S. PATENT DOCUMENTS

| | | | |
|---|---|---|---|
| 2021/0204200 A1* | 7/2021 | Krishan | H04L 41/5058 |
| 2021/0235254 A1 | 7/2021 | Farooq | |
| 2021/0273977 A1 | 9/2021 | Karasaridis et al. | |
| 2021/0274392 A1 | 9/2021 | Dao et al. | |
| 2021/0297935 A1 | 9/2021 | Belling et al. | |
| 2021/0367916 A1 | 11/2021 | Belling et al. | |
| 2021/0385286 A1 | 12/2021 | Wang et al. | |
| 2021/0385732 A1 | 12/2021 | Reyes et al. | |
| 2022/0038545 A1 | 2/2022 | Krishan | |
| 2022/0070648 A1 | 3/2022 | Krishan | |
| 2022/0131945 A1 | 4/2022 | Sapra et al. | |

FOREIGN PATENT DOCUMENTS

| | | |
|---|---|---|
| EP | 2 575 303 A1 | 4/2013 |
| WO | WO 2017/143915 A1 | 8/2017 |
| WO | WO 2018/174021 A1 | 9/2018 |
| WO | WO 2018/174516 A1 | 9/2018 |
| WO | WO 2019/144321 A1 | 1/2019 |
| WO | WO 2019/034609 A1 | 2/2019 |
| WO | WO 2019/062596 A1 | 4/2019 |
| WO | WO 2019/076273 A1 | 4/2019 |
| WO | WO 2019/144321 A1 | 8/2019 |
| WO | WO 2019/215308 A1 | 11/2019 |
| WO | WO 2019/220172 A1 | 11/2019 |
| WO | WO 2020/091934 A1 | 5/2020 |
| WO | WO 2020/263486 A1 | 12/2020 |
| WO | WO 2021/040827 A1 | 3/2021 |
| WO | WO 2021/055998 A1 | 3/2021 |
| WO | WO 2021/138074 A1 | 7/2021 |
| WO | WO 2022/025987 A1 | 2/2022 |
| WO | WO 2022/050987 A1 | 3/2022 |

OTHER PUBLICATIONS

Notice of Allowance and Fee(s) Due for U.S. Appl. No. 16/356,446 (dated Sep. 30, 2021).

Notification of Transmittal of the International Search Report and the Written Opinion of the International Searching Authority, or the Declaration for International Application No. PCT/US2021/033031 (dated May 18, 2021).

Non-Final Office Action for U.S. Appl. No. 16/945,794 (dated Sep. 15, 2021).

Commonly-assigned, co-pending U.S. Appl. No. 17/468,076 for "Methods, Systems, and Computer Readable Media for Using Service Communications Proxy (SCP) or Security Edge Protection Proxy (SEPP) to Apply or Override Preferred-Locality Attribute During Network Function (NF) Discovery" (Unpublished, filed Sep. 7, 2021).

Commonly-assigned, co-pending U.S. Appl. No. 17/487,142 for "Methods, Systems, and Computer Readable Media for Network Function Discovery Using Preferred-Locality Information" (Unpublished, filed Sep. 28, 2021).

Commonly-assigned, co-pending U.S. Appl. No. 17/397,968 for "Methods, Systems, and Computer Readable Media for Processing Network Function (NF) Discovery Requests at NF Repository Function (NRF) Using Prioritized Lists of Preferred Locations," (Unpublished, filed Aug. 9, 2021).

Non-Final Office Action for U.S. Appl. No. 16/356,446 (dated Jun. 16, 2021).

Commonly-assigned, co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 2, 2021).

"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).

"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).

"3rd Generation Partnership Project; Technical Specification Group Services and System Aspects; Security architecture and procedures for 5G system (Release 17)," 3GPP TS 33.501, V17.1.0, pp. 1-256 (Mar. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

Commonly-assigned, co-pending U.S. Appl. No. 17/203,693 for "Methods, Systems, and Computer Readable Media for Hypertext Transfer Protocol (HTTP) Stream Tuning for Load and Overload Control," (Unpublished, filed Mar. 16, 2021).

Commonly-assigned, co-pending U.S. Appl. No. 17/009,725 for "Methods, Systems, and Computer Readable Media for Service Communications Proxy (SCP)—Specific Prioritized Network Function (NF) Discovery and Routing," (Unpublished, filed Sep. 1, 2020).

Vixie et al., "Dynamic Updates in the Domain Name System (DNS Update)," Network Working Group, RFC 2136, pp. 1-26 (Apr. 1997).

Commonly-assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications via Service Communications Proxy (SCP)" (Unpublished, filed Aug. 3, 2021).

Notice of Allowance and Fee(s) Due for U.S. Appl. No. 16/730,799 (dated Jul. 30, 2021).

Notification of Transmittal of the International Search Report and the Written Opinion of the International Searching Authority, or the Declaration for International Application No. PCT/US2021/024000 (dated Jun. 24, 2021).

Commonly-assigned, co-pending U.S. Appl. No. 17/356,451 for "Methods, Systems, and Computer Readable Media for Resolution of Inter-Network Domain Names" (Unpublished, filed Jun. 23, 2021).

Notification of Transmittal of the International Search Report and the Written Opinion of the International Searching Authority, or the Declaration for U.S. Patent Application Serial No. PCT/US2021/020120 (dated Jun. 1, 2021).

Notification of Transmittal of the International Search Report and the Written Opinion of the International Searching Authority, or the Declaration for U.S. Patent Application Serial No. PCT/US2021/020122 (dated Jun. 1, 2021).

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Core Network and Terminals; Numbering, addressing and identification; (Release 17)," 3GPP TS 23.003, V17.1.0, pp. 1-143 (Mar. 2021).

"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).

Nokia et al., "Discussion paper on authorization for Model D Indirect communications", 3GPP TSG SA WG3; S3-194380 (Nov. 11, 2019).

Notice of Allowance and Fee(s) Due for U.S. Appl. No. 16/697,021 (dated Jun. 21, 2021).

Advisory Action for U.S. Appl. No. 16/697,021 (dated May 7, 2021).

Applicant-Initiated Interview Summary for U.S. Appl. No. 17/001,599 (dated May 5, 2021).

Notification of Transmittal of the International Search Report and the Written Opinion of the International Searching Authority, or the Declaration for International Application Serial No. PCT/US2020/065765 (dated Apr. 15, 2021).

(56) References Cited

OTHER PUBLICATIONS

Ex Parte Quayle Action for U.S. Appl. No. 16/730,799 (Apr. 7, 2021).
Notice of Allowance and Fee(s) Due for U.S. Appl. No. 16/555,817 (dated Mar. 24, 2021).
International Search Report and Written Opinion for Patent Cooperation Treaty Application Serial No. PCT/US2020/061885 (dated Feb. 4, 2021).
International Search Report and Written Opinion for Patent Cooperation Treaty Application Serial No. PCT/US2020/057712 (dated Feb. 2, 2021).
Cheshire, S. et al., "Apple's DNS Long-Lived Queries protocol draft-sekar-dns-llq-06," Internet Engineering Task Force (IETF), pp. 1-26 (Aug. 23, 2019).
Final Office Action for U.S. Appl. No. 16/697,021 (dated Feb. 2, 2021).
Applicant-Initiated Interview Summary for U.S. Appl. No. 16/697,021 (dated Jan. 26, 2021).
Advisory Action for U.S. Appl. No. 16/356,446 (dated Dec. 22, 2020).
Notice of Allowance and Fee(s) Due for U.S. Appl. No. 16/555,817 (Dec. 3, 2020).
Commonly-assigned, co-pending U.S. Continuation-in-Part U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Nov. 23, 2020).
Commonly-assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).
Commonly-assigned, co-pending U.S. Appl. No. 17/082,871 for "Methods, Systems, and Computer Readable Media for Rank Processing for Network Function Selection," (Unpublished, filed Oct. 28, 2020).
Commonly-assigned, co-pending U.S. Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).
"P-GW Administration Guide, StarOS Release 21.20," Cisco, pp. 1-1164 (Oct. 11, 2020).
Commonly-assigned, co-pending U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Sep. 23, 2020).
"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).
3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).
Non-Final Office Action for U.S. Appl. No. 16/697,021 (dated Sep. 29, 2020).
Final Office Action for U.S. Appl. No. 16/356,446 (dated Sep. 8, 2020).
Notice of Allowance and Fee(s) Due and Examiner-Initiated Interview Summary for U.S. Appl. No. 16/453,955 (dated Aug. 26, 2020).
Notification of the Transmittal of the International Search Report and the Written Opinion of the International Searching Authority, or the Declaration for International Application No. PCT/US2020/034723 (dated Aug. 17, 2020).
Non-Final Office Action for U.S. Appl. No. 16/555,817 (dated Aug. 7, 2020).
Commonly-assigned, co-pending U.S. Appl. No. 16/945,794 for "Methods, Systems, and Computer Readable Media for Preferred Network Function (NF) Location Routing Using Service Communications Proxy (SCP)," (Unpublished, filed Jul. 31, 2020).
Notification of Transmittal of the International Search Report and the Written Opinion of the International Searching Authority, or the Declaration for International Application Serial No. PCT/US2020/035004 (dated Jul. 7, 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).
Notice of Allowance and Fee(s) Due for U.S. Appl. No. 16/369,691 (dated May 12, 2020).
Non-Final Office Action for U.S. Appl. No. 16/356,446 (dated May 11, 2020).
Notice of Allowance and Fee(s) Due for U.S. Appl. No. 16/176,920 (dated Apr. 16, 2020).
Applicant-Initiated Interview Summary for U.S. Appl. No. 16/176,920 (dated Apr. 1, 2020).
Non-Final Office Action for U.S. Appl. No. 16/176,920 (dated Mar. 6, 2020).
"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Notification of Transmittal of the International Search Report and the Written Opinion of the International Searching Authority, or the Declaration for International Application Serial No. PCT/US2019/053912 (dated Dec. 18, 2019).
Commonly-assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).
"5G; System architecture for the 5G System (5GS) (3GPP TS 23.501 version 15.6.0 Release 15)," ETSI TS 123 501, V15.6.0, pp. 1-168 (Oct. 2019).
"5G; 5G System; Network function repository services; Stage 3 (3GPP TS 29.510 version 15.5.1 Release 15)," ETSI TS 129 510, V15.5.1, pp. 1-132 (Oct. 2019).
"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).
"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).
"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).
"3rd Generation Partnership Project; Technical Specification Group Services and System Aspects; Architecture enhancements to facilitate communications with packet data networks and applications (Release 16)," 3GPP TS 23.682, V16.4.0, pp. 1-30 (Sep. 2019).
"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).
Cheshire et al., "Apple's DNS Long-Lived Queries protocol," Network Working Group, Apple, Inc., pp. 1-26 (Aug. 22, 2019).
"Diameter and Diameter Applications," Alcatel-Lucent, http://infodoc.alcatel-lucent.com/htrnl/0_add-h-f/93-0098-HTML/7750_SR_OS_Triple_Play_Guide/GX-PolicyMgmt.html, pp. 1-40 (Aug. 22, 2019).
"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).
Commonly-assigned, co-pending U.S. Appl. No. 16/453,955 for "Methods, Systems, and Computer Readable Media for Producer

(56) References Cited

OTHER PUBLICATIONS

Network Function (NF) Service Instance Wide Egress Rate Limiting at Service Communication Proxy (SCP)," (Unpublished, filed Jun. 26, 2019).
"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).
"3rd Generation Partnership Project; Technical Specification Group Core Network and Terminals; 5G System; Restoration Procedures (Release 16)," 3GPP TS 23.527, V16.0.0, pp. 1-19 (Jun. 2019).
"3rd Generation Partnership Project; Technical Specification Group Core Network and Terminals; Numbering, addressing and identification (Release 15)," 3GPP TS 23.003, V15.7.0, pp. 1-131 (Jun. 2019).
Huawei, "eSBA: reselection of producer instance," 3GPP TSG-SA2 Meeting #132, pp. 1-2 (Apr. 12, 2019).
"Class of Service Feature Guide (Routers and EX9200 Switches)," Junos® OS, Juniper Networks, pp. 1-1530 (Apr. 10, 2019).
"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).
Penttinen, "5G Explained: Security and Deployment of Advanced Mobile Communications," Chapter 6, Section 6.3.8 NRF, 2 pages (Feb. 2019).
"Oracle Communications Diameter Signaling Router," Release Notice, Release 8.3, E93179 Revision 02, Oracle, pp. 1-98 (Dec. 2018).
"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).
"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).
"Addressing 5G Network Function Requirements," Intel® FPGAs and Intel PAC 5G QoS and IPSec Benchmarking, White Paper, pp. 1-8 (Oct. 2018).
"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123 502 V15.2.0, pp. 1-46 (Jun. 2018).
Docomo, "Update Solution 4 for implicit registration," SA WG2 Meeting #129, pp. 1-2 (Oct. 15-19, 2018).
"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).
Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).
Scholl et al., "An API First Approach to Microservices Development," Oracle, https://blogs.oracle.com/developers/an-api-first-approach-to-microservices-development, pp. 1-12 (Nov. 8, 2017).
Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).

"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).
"Pseudo-CR on Service Discovery and Registration using NRF service," Ericsson, 3GPP TSG CT4 Meeting #79, 3GPP TR 29.891— v0.3.0, pp. 1-4 (Aug. 21-25, 2017).
Carlton et al., "HTTP and DNS in a 5G World," https://www.computerworld.com/article/3204594/http-and-dns-in-a-5g-world.html, pp. 1-5 (Jun. 30, 2017).
Benacer et al., "A High-Speed Traffic Manager Architecture for Flow-Based Networking," pp. 1-4 (2017).
"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).
"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).
"Multi-Layer Security Protection for Signaling Networks," Oracle Communications, Oracle white paper, pp. 1-9 (Jan. 2016).
Kantola et al., "Policy-based communications for 5G mobile with customer edge switching," Security and Communication Networks, vol. 9, pp. 3070-3082 (2016).
Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).
Abley et al., "A Mechanism for Remote-Triggered DNS Cache Flushes (DNS Flush)," Network Working Group, Google, pp. 1-12 (Jun. 24, 2013).
Preston-Werner, "Semantic Versioning 2.0.0", Oracle, pp. 1-5 (Jun. 2013).
"LTE and Beyond," https://ytd2525.wordpress.com/2013/03/06/lte-and-beyond/, 3 pages (2013).
Fajardo et al., "Diameter Based Protocol," Internet Engineering Task Force (IETF) Request for Comments: 6733, pp. 1-152 (Oct. 2012).
Gulbrandsen et al., "A DNS RR for specifying the location of services (DNS SRV)," RFC 2782, pp. 1-12 (Feb. 2000).
Nichols et al., "Definition of the Differentiated Services Field (DS Field) in the IPv4 and IPv6 Headers," Internet Engineering Task Force (IETF) Network Working Group Request for Comments (RFC) 2474, The Internet Society, pp. 1-20 (Dec. 1998).
Notice of Publication for International Application Serial No. PCT/US2020/061885 (dated Jun. 3, 2021).
Notice of Allowance and Fee(s) Due for U.S. Appl. No. 17/001,599 (dated May 17, 2021).
Notice of Allowance and Fee(s) Due for U.S. Appl. No. 16/555,817 (dated Dec. 3, 2020).
Commonly-assigned, co-pending U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (filed Sep. 23, 2020).
Commonly-assigned, co-pending U.S. Appl. No. 16/945,794 for "Methods, Systems, and Computer Readable Media for Preferred Network Function (NF) Location Routing Using Service Communications Proxy (SCP)," (filed Jul. 31, 2020).
Commonly-assigned, co-pending U.S. Appl. No. 16/697,021 for "Methods, Systems, and Computer Readable Media for Diameter-Peer-Wide Egress Rate Limiting at Diameter Relay Agent (DRA)," (filed Nov. 27, 2019).
Commonly-assigned, co-pending U.S. Appl. No. 16/453,955 for "Methods, Systems, and Computer Readable Media for Producer Network Function (NF) Service Instance Wide Egress Rate Limiting at Service Communication Proxy (SCP)," (filed Jun. 26, 2019).
Nichols et al., "Definition of the Differentiated Services Field (DS Field) in the IPv4 and IPv6 Headers," Internet Engineering Task Force (IEFT) Netwok Working Group Request for Comments (RFC) 2474, The Internet Society, pp. 1-20 (Dec. 1998).

(56) References Cited

OTHER PUBLICATIONS

"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).

Final Office Action for U.S. Appl. No. 17/082,871 (dated Jun. 6, 2022).

Notice of Allowance for U.S. Appl. No. 17/009,725 (dated Jun. 13, 2022).

"3rd Generation Partnership Project; Technical Specification Group Core Network and Terminals; 5G System; Network Function Repository Services, Stage 3 (Release 16)," 3GPP TS 29.510, V16.6.0, pp. 1-227 (Jan. 2021).

Notification of Transmittal of the International Search Report and the Written Opinion of the International Searching Authority, or the Declaration for International Application No. PCT/US2022/019848 (dated Jun. 14, 2022).

Advisory Action and Examiner-Initiated Interview Summary for U.S. Appl. No. 16/945,794 (dated May 20, 2022).

Final Office Action for U.S. Appl. No. 16/945,794 (dated Feb. 8, 2022).

Non-Final Office Action for U.S. Appl. No. 17/082,871 (dated Feb. 7, 2022).

Commonly-assigned, co-pending U.S. Appl. No. 17/356,461 for "Methods, Systems and Computer Readable Media for Optimizing Network Traffic Distribution using Timeslot-Based Tracked Producer Network Function (NF) Performance During Producer NF Selection" (Unpublished, filed Jun. 23, 2021).

"3rd Generation Partnership Project; Technical Specification Group Services and System Aspects; Procedures for the 5G System (5GS); Stage 2 (Release 17)," 3GPP TS 23.502, V17.0.0, pp. 1-646.

\* cited by examiner

METHODS, SYSTEMS, AND COMPUTER READABLE MEDIA FOR SUPPORTING MULTIPLE PREFERRED LOCALITIES FOR NETWORK FUNCTION (NF) DISCOVERY AND SELECTION PROCEDURES

TECHNICAL FIELD

The subject matter described herein relates to NF discovery and selection. More particularly, the subject matter described herein relates to methods, systems, and computer readable media supporting multiple preferred localities in NF discovery and selection procedures.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is the inflexibility of the 3GPP-defined NF discovery procedure in discovering other NFs in the same locality or in a locality that is near to a consumer NF. 3GPP TS 29.510 allows each NF to register its own locality with the NRF. 3GPP TS 29.510 also allows consumer NFs to specify a single preferred producer NF location or locality in a preferred-locality attribute as part of an NF discovery request. However, if there are no producer NFs in the locality that matches the locality specified in the preferred-locality attribute in the discovery request, the NRF may return a set of NF profiles in response to a discovery request, some of which may be more preferred than others. The consumer NF may be required to parse through the NF profiles and extract or read the locality attribute of each profile to identify those with more preferred localities than others. Such processing cannot be reduced or avoided given the inflexibility of existing NF discovery procedures.

Accordingly, there exists a need for improved methods, systems, and computer readable media for NF discovery and selection that considers multiple different locality preferences of a consumer NF.

SUMMARY

A method for supporting multiple preferred producer NF locations in a preferred-locality attribute for network function (NF) discovery and selection includes, at an NF repository function (NRF) including at least one processor and a memory, receiving, from producer NFs, NF registration messages including NF profiles with locality attributes and registering the producer NFs by storing the NF profiles including the locality attributes in an NF registration database local to the NRF. The method further includes receiving, from a requesting NF, an NF discovery request having query parameters for discovering producer NFs, the query parameters including a preferred-locality attribute identifying a plurality of different preferred producer NF locations. The method further includes retrieving NF profiles from the NF registration database having locality attributes that match any of the preferred producer NF locations. The method further includes generating an NF discovery response including the NF profiles retrieved from the NF registration database. The method further includes forwarding the NF discovery response to the requesting NF.

According to another aspect of the subject matter described herein, receiving the NF discovery request from a requesting NF includes receiving the NF discovery request from a consumer NF.

According to another aspect of the subject matter described herein, receiving the NF discovery request from a requesting NF includes receiving the NF discovery request from a service communications proxy (SCP) performing delegated discovery on behalf of a consumer NF.

According to another aspect of the subject matter described herein, receiving the NF discovery request includes receiving an NF discovery request that indicates relative preferences of the requesting NF of the preferred NF locations.

According to another aspect of the subject matter described herein, generating the NF discovery response includes indicating, in the NF discovery response, relative preferences of the NF profiles based on the relative preferences indicated in the discovery request.

According to another aspect of the subject matter described herein, indicating the relative preferences of the NF profiles includes one of: setting priority attributes of the NF profiles based on the relative preferences indicated in the discovery request; and ordering the NF profiles in the discovery response based on the relative preferences indicated in the discovery request.

According to another aspect of the subject matter described herein, the method for supporting multiple preferred producer NF locations in the preferred-locality attribute includes retrieving NF profiles from the NF registration database having attributes that match NF selection attributes in the discovery request but that do not have locality attributes that match any of the different preferred producer NF locations.

According to another aspect of the subject matter described herein, generating the discovery response includes including, in the discovery response, the NF profiles in having attributes that match NF selection attributes in the discovery request but that do not have locality attributes that match any of the different preferred producer NF locations and indication that the NF profiles having locality attributes that match one of the preferred producer NF locations are more preferred than the NF profiles having attributes that match NF selection attributes in the discovery request but that do not have locality attributes that match any of the different preferred producer NF locations.

According to another aspect of the subject matter described herein, generating the discovery response includes excluding, from the discovery response NF profiles that do not match any of the preferred producer NF locations.

According to another aspect of the subject matter described herein, the method for supporting plural preferred producer NF locations in the preferred-locality attribute includes, at the requesting NF, receiving the discovery response, selecting one of the NF profiles having a locality attribute that matches one of the preferred NF locations, and sending a service based interface (SBI) service request to a producer NF corresponding to the selected NF profile.

According to another aspect of the subject matter described herein, a system for supporting multiple locations in a preferred-locality attribute for network function (NF) discovery and selection, is provided. The system includes an NF repository function (NRF) including at least one processor and a memory. The system further includes an NF discovery/registration manager implemented by the at least one processor for receiving, from producer NFs, NF registration messages including NF profiles with locality attributes and registering the producer NFs by storing the NF profiles including the locality attributes in an NF registration database local to the NRF, receiving, from a requesting NF, an NF discovery request having query parameters for discovering producer NFs, the query parameters including a preferred-locality attribute identifying a plurality of different preferred producer NF locations, retrieving NF profiles from the NF registration database having locality attributes that match any of the preferred producer NF locations, generating an NF discovery response including the NF profiles retrieved from the NF registration database, and forwarding the NF discovery response to the requesting NF.

According to another aspect of the subject matter described herein, the requesting NF comprises a consumer NF.

According to another aspect of the subject matter described herein, the requesting NF comprises a service communications proxy (SCP) performing delegated discovery on behalf of a consumer NF.

According to another aspect of the subject matter described herein, the NF discovery request indicates relative preferences of the requesting NF of the preferred NF locations.

According to another aspect of the subject matter described herein, in generating the NF discovery response, the NF discovery/registration manager is configured to indicate, in the NF discovery response, relative preferences of the NF profiles based on the relative preferences indicated in the discovery request.

According to another aspect of the subject matter described herein, the NF discovery/registration manager is configured to indicate the relative preferences of the NF profiles in the discovery response by one of: setting priority attributes of the NF profiles based on the relative preferences indicated in the discovery request; and ordering the NF profiles based on the relative preferences indicated in the discovery request.

According to another aspect of the subject matter described herein, the NF discovery/registration manager is configured to retrieve NF profiles from the NF registration database having attributes that match NF selection attributes in the discovery request but that do not have locality attributes that match any of the different preferred producer NF locations.

According to another aspect of the subject matter described herein, wherein the NF discovery/registration manager is configured to include, in the discovery response, the NF having attributes that match NF selection attributes in the discovery request but that do not have locality attributes that match any of the different preferred producer NF locations and an indication that the NF profiles having locality attributes that match one of the preferred producer NF locations are more preferred than the NF profiles having attributes that match NF selection attributes in the discovery request but that do not have locality attributes that match any of the different preferred producer NF locations.

According to another aspect of the subject matter described herein, the indication in the discovery response includes one of: priority attributes in the NF profiles; and an order of the NF profiles in the discovery response.

According to another aspect of the subject matter described herein, A non-transitory computer readable medium having stored thereon executable instructions that when executed by a processor of a computer control the computer to perform steps. The steps include receiving, from producer network functions (NFs), NF registration messages including NF profiles with locality attributes and registering the producer NFs by storing the NF profiles including the locality attributes in an NF registration database local to an NF repository function (NRF). The steps further include receiving, from a requesting NF, an NF discovery request having query parameters for discovering producer NFs, the query parameters including a preferred-locality attribute identifying a plurality of different preferred producer NF locations. The steps further include retrieving NF profiles from the NF registration database having locality attributes that match any of the preferred producer NF locations. The steps further include generating an NF discovery response including the NF profiles retrieved from the NF registration database. The steps further include forwarding the NF discovery response to the requesting NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
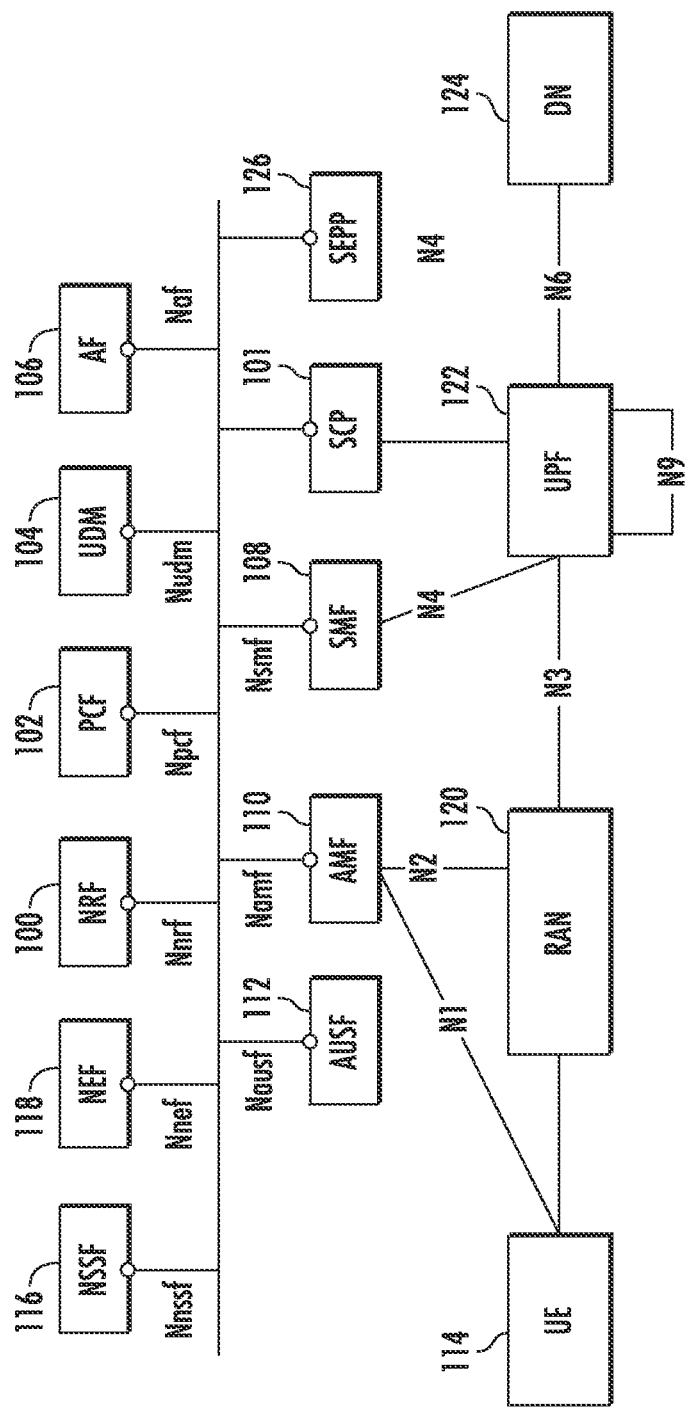
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a UDM function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipments (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
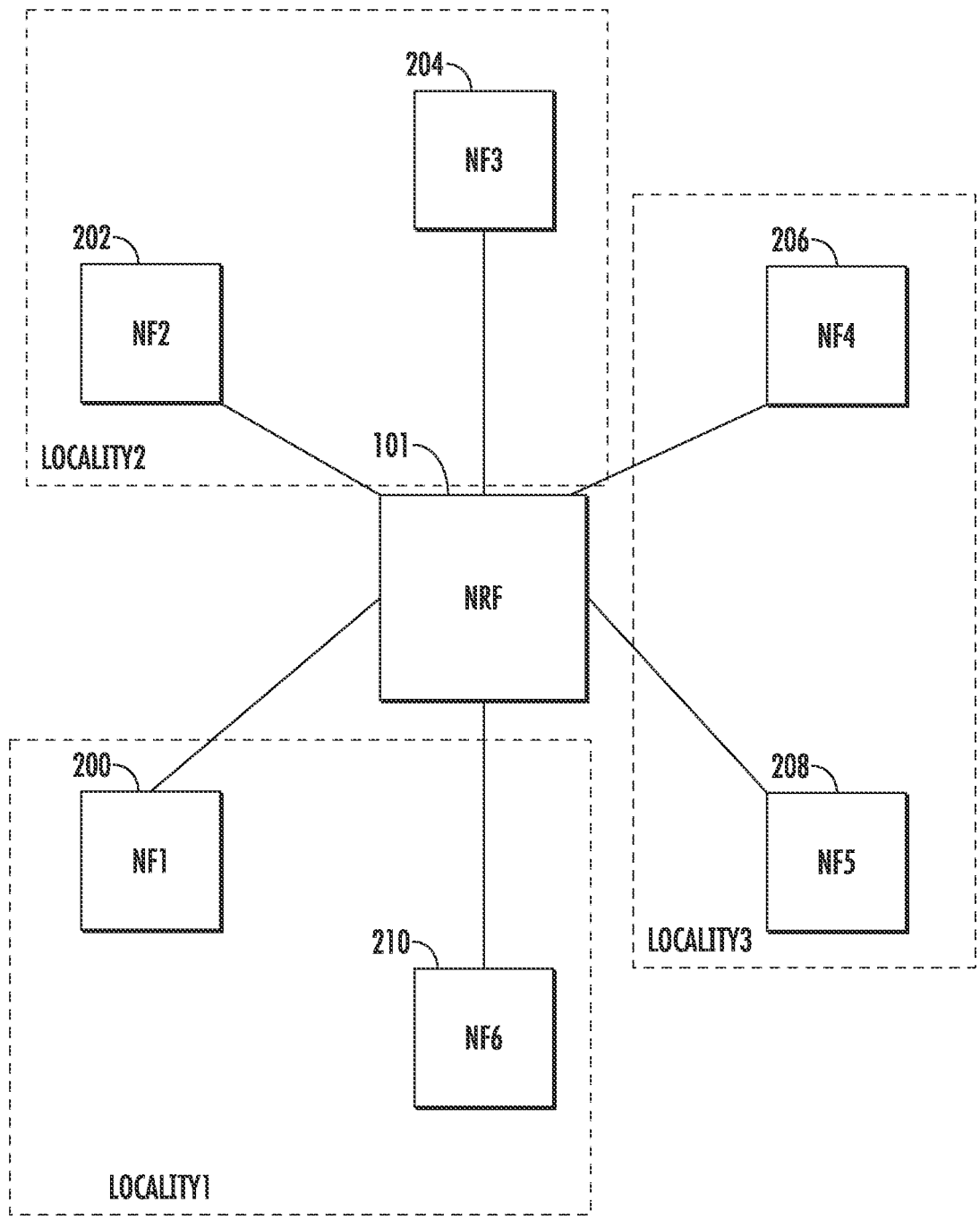
FIG. 2 is a network diagram illustrating NFs located in different localities and an NRF.

As described above, one problem that can occur in 5G networks is the inability to provide for fine-grained specification of preferred producer NF localities during the NF discovery process. FIG. 2 is a network diagram illustrating an NRF and a plurality of NFs located in different localities. In FIG. 2, NF1 200 and NF6 210 are located in locality1. NF2 202 and NF3 204 are located in locality2. NF4 206 and NF5 208 are located in locality3. Each of the NFs illustrated in FIG. 2 can register their NF profiles, which include their localities, with NRF 100.

Figure 3:
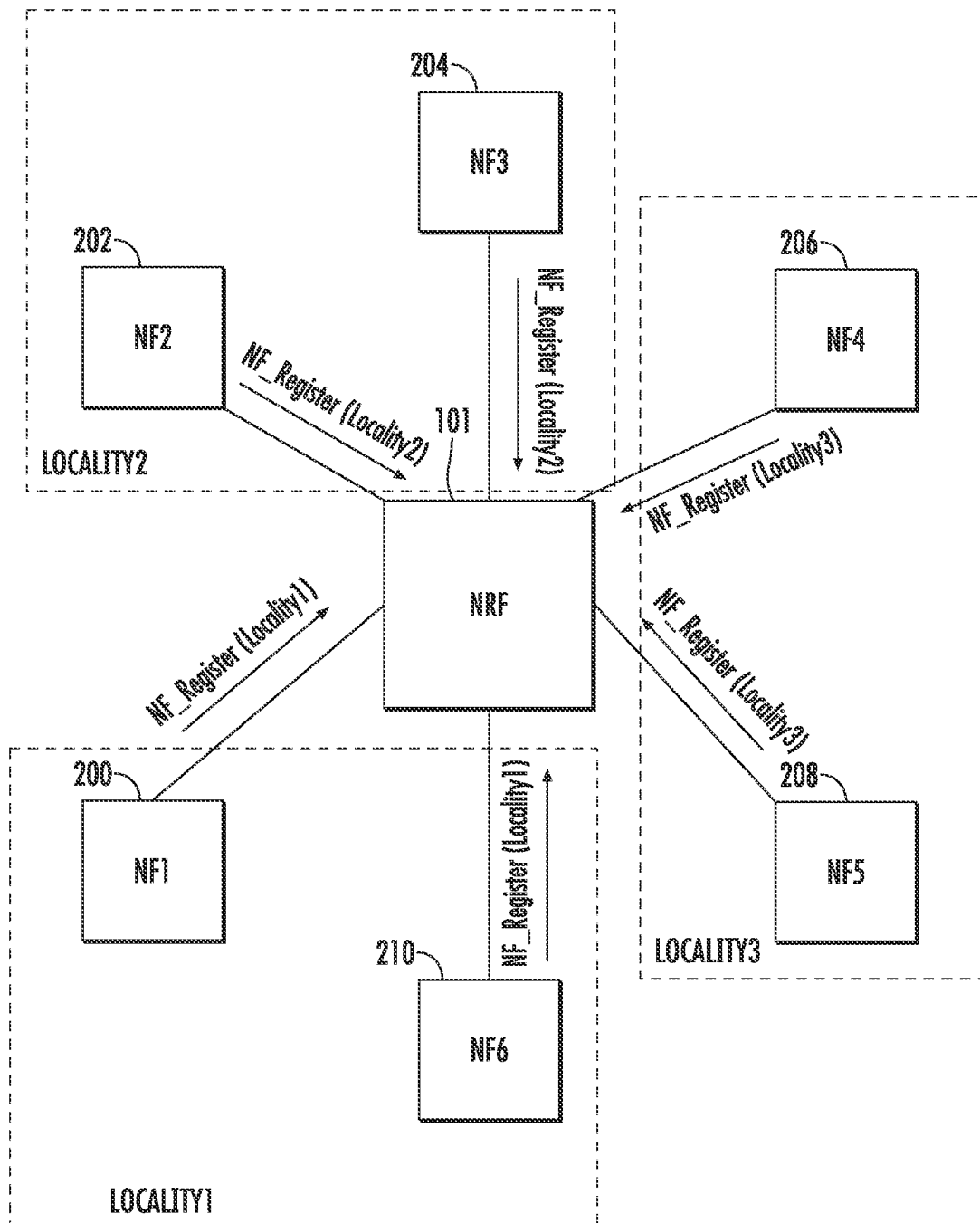
FIG. 3 is a network diagram illustrating the NFs of FIG. 2 registering with the NRF.

FIG. 3 illustrates each of NFs 200, 202, 204, 206, 208, and 210 registering with NRF 100. The registration process is conducted according to 3GPP TS 29.510 where each NF sends an NF register message to NRF 100. The NF register message includes the NF profile of each NF. Table 6.1.6.2.2-1 of 3GPP TS 29.510 defines the attributes that may be included in an NF profile. Of interest to the subject matter described herein is the locality attribute of the NF profile. Table 1 shown below is an excerpt from Table 6.1.6.2.2-1 of 3GPP TS 29.510 illustrating the locality attribute.

TABLE 1

Locality Attribute of NF Profile

| Attribute name | Data type | P | Cardinality | Description |
|---|---|---|---|---|
| locality | string | O | 0 . . . 1 | Operator defined information about the location of the NF instance (e.g. geographic location, data center) (NOTE 3) |

NOTE 3:
A requester NF may use this information to select a NF instance (e.g. a NF instance preferably located in the same data center).

As illustrated by Table 1, the locality attribute stores operator defined information about the location of an NF instance, such as geographic location and data center. According to Note 3 of Table 1, the locality attribute can be used during NF discovery to select a producer NF that is in the same data center as the requesting consumer NF. However, because 3GPP TS 29.510 only allows the consumer NF to specify a single preferred locality during NF discovery, the consumer NF may receive NF profiles of producer NFs that are not in the preferred locality, resulting an additional processing burden on the consumer NF to identify and select an optimal producer NF.

Figure 4:
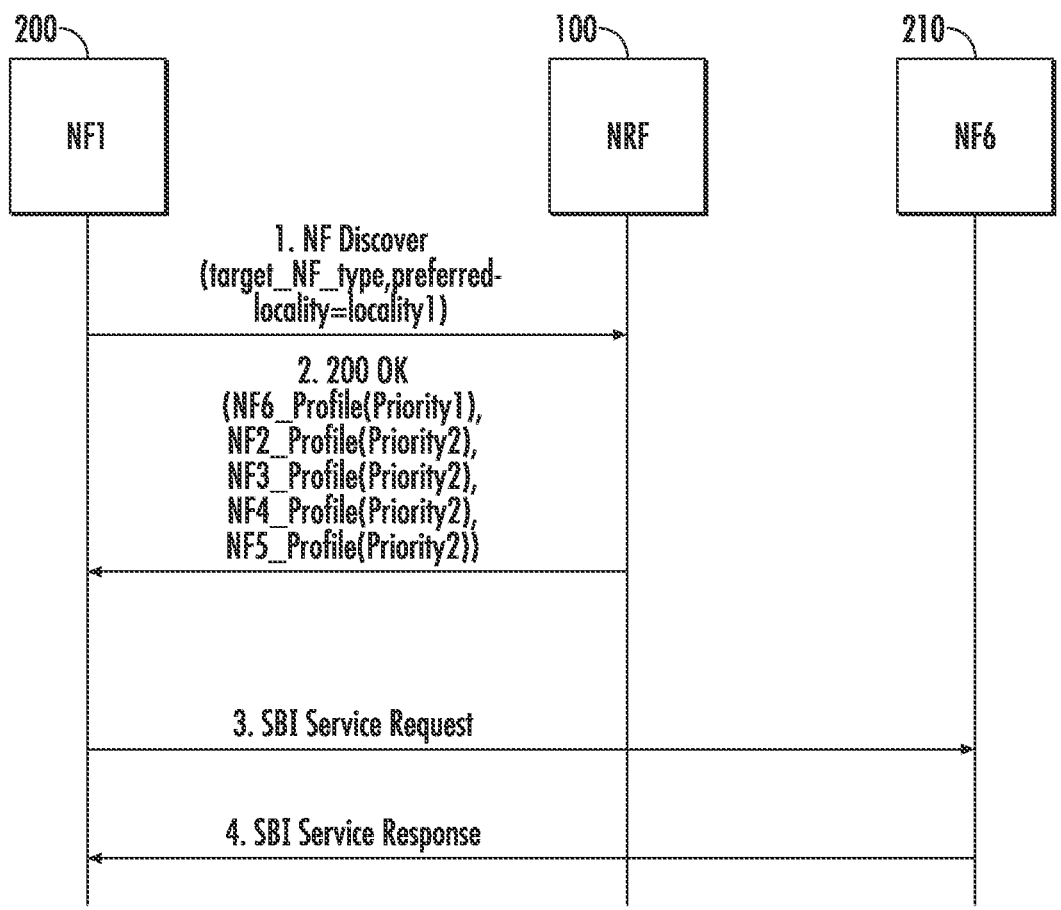
FIG. 4 is a message flow diagram illustrating exemplary messages exchanged for NF service discovery using a single preferred locality and subsequent NF selection where an NF in the preferred locality is available.

FIG. 4 is a message flow diagram illustrating the use of the locality attribute along with the preferred-locality attribute during the NF discovery process. Referring to FIG. 4, in line 1 of the message flow diagram, NF1 200 sends an NF discover message to NRF 100. The NF discover message includes a target NF type and a preferred-locality attribute that indicates a single preferred producer NF location. In the illustrated example, the preferred-locality attribute identifies locality1 as the preferred locality. Upon receiving the NF discover message, NRF 100 searches its NF registration database and identifies any NFs of the target NF type having a locality attribute that matches the locality specified in the NF discover message. In this example, there is one NF, NF6 210, whose locality attribute matches the locality specified in the preferred-locality attribute of the NF discover message. Table 2 shown below is an excerpt from Table 6.2.3.2.3.1-1 of 3GPP TS 29.510 and indicates how the NRF processes the preferred-locality attribute in a discovery request.

TABLE 2

NRF Processing of Preferred-Locality Attribute

| Attribute Name | Data Type | P | Cardinality | Description | Applicability |
|---|---|---|---|---|---|
| Preferred-locality | String | O | 0 . . . 1 | Preferred target NF location (e.g. geographic location, data center). When present, the NRF shall prefer NF profiles with a locality attribute that matches the preferred-locality. The NRF may return additional NFs in the response not matching the preferred target NF location, e.g. if no NF profile is found matching the preferred target NF location. The NRF should set a lower priority for any additional NFs on the response not matching the preferred target NF location than those matching the preferred target NF location. (NOTE 6) | |

From Table 2, win the locality attribute is present, the NRF should prefer NF profiles with the locality that matches the preferred locality. The NRF may also return additional NF profiles in the discovery response not matching the preferred locality, for example, if no NF profile is found matching the preferred locality. The NRF may also set a lower priority for additional NF profiles in the discovery response that do not match the preferred locality. There are two possible interpretations of Note C—one is that the NRF should only return additional NF profiles if no NF profiles matching the preferred locality are present. Another interpretation is that the NRF can return additional NF profiles with lower priority even if NF profiles matching the preferred locality are present.

FIG. 4 assumes that the second interpretation of Note C is implemented where the NRF returns the NF profile of an NF matching the preferred locality along with the NF profiles of NFs not matching the preferred locality. In line 2 of FIG. 4, NRF 100 returns, in response to the discovery request, a 200 OK message with the NF profile of NF6 210, which matches the preferred locality parameter. The discovery response also includes the NF profiles of NF2-NF5 with a priority that is higher (less preferred) than the NF profile of NF6 210.

In line 3 of the message flow diagram in FIG. 4, NF 200 selects NF6 210 to provide the requested service and sends an SBI service request to NF6 210. In line 4 of the message flow diagram, NF6 210 responds to the SBI service request with an SBI service response message. Thus, FIG. 4 illustrates the case where a single preferred locality is used to discover and select a producer NF to provide service to a consumer NF.

The use of a preferred-locality attribute with a single preferred NF location in NF discovery works when the NF matching the consumer NF's preferred locality is available. However, if there are no NFs matching the consumer NF's preferred locality, the consumer NF may receive multiple NF profiles that do not match the preferred locality and may be required to parse each of the profiles, identify their localities, and then select one of the profiles based on the consumer NF's preferred locality.

Figure 5:
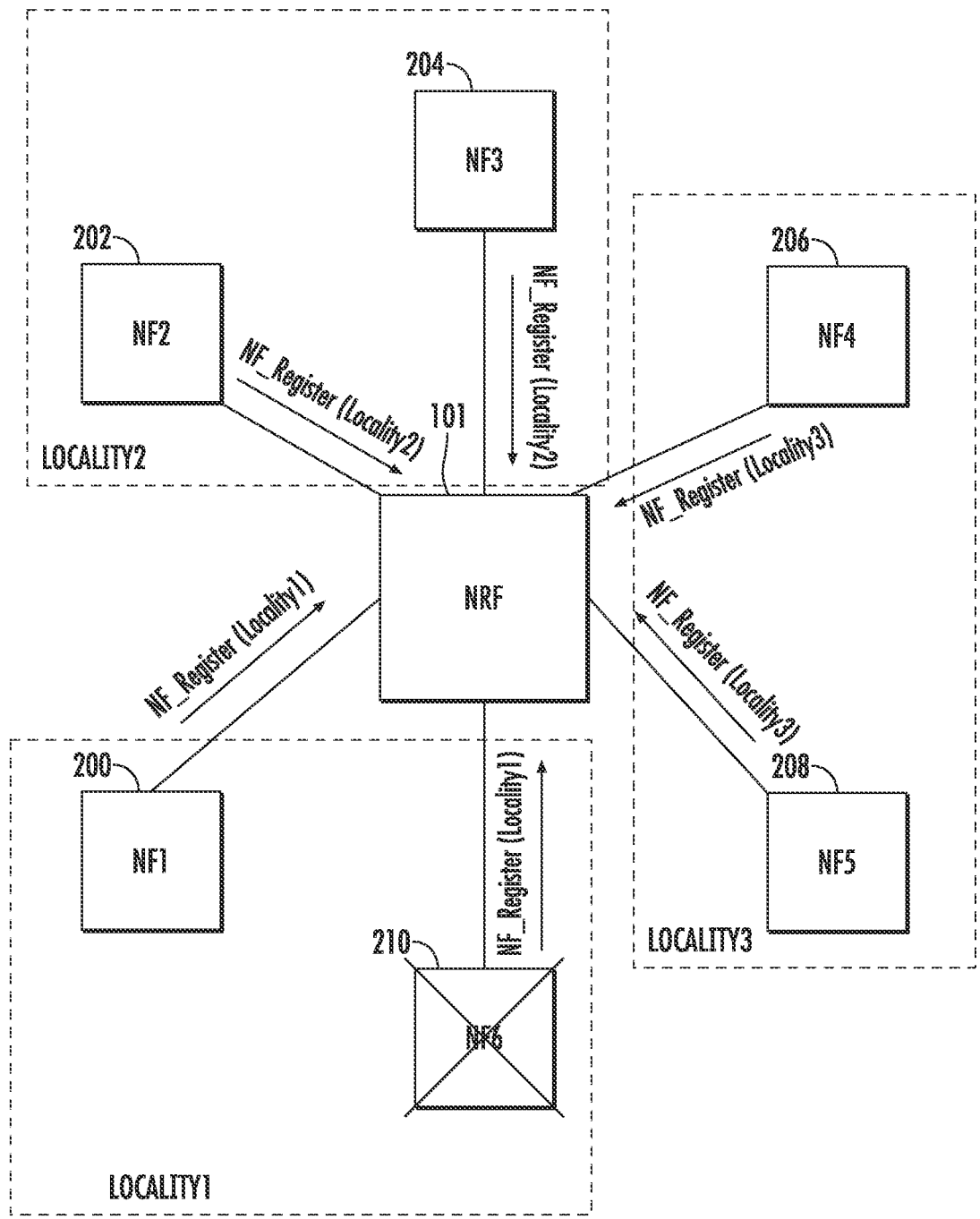
FIG. 5 is a network diagram illustrating one of the NFs in FIGS. 2 and 3 becoming unavailable.
Figure 6:
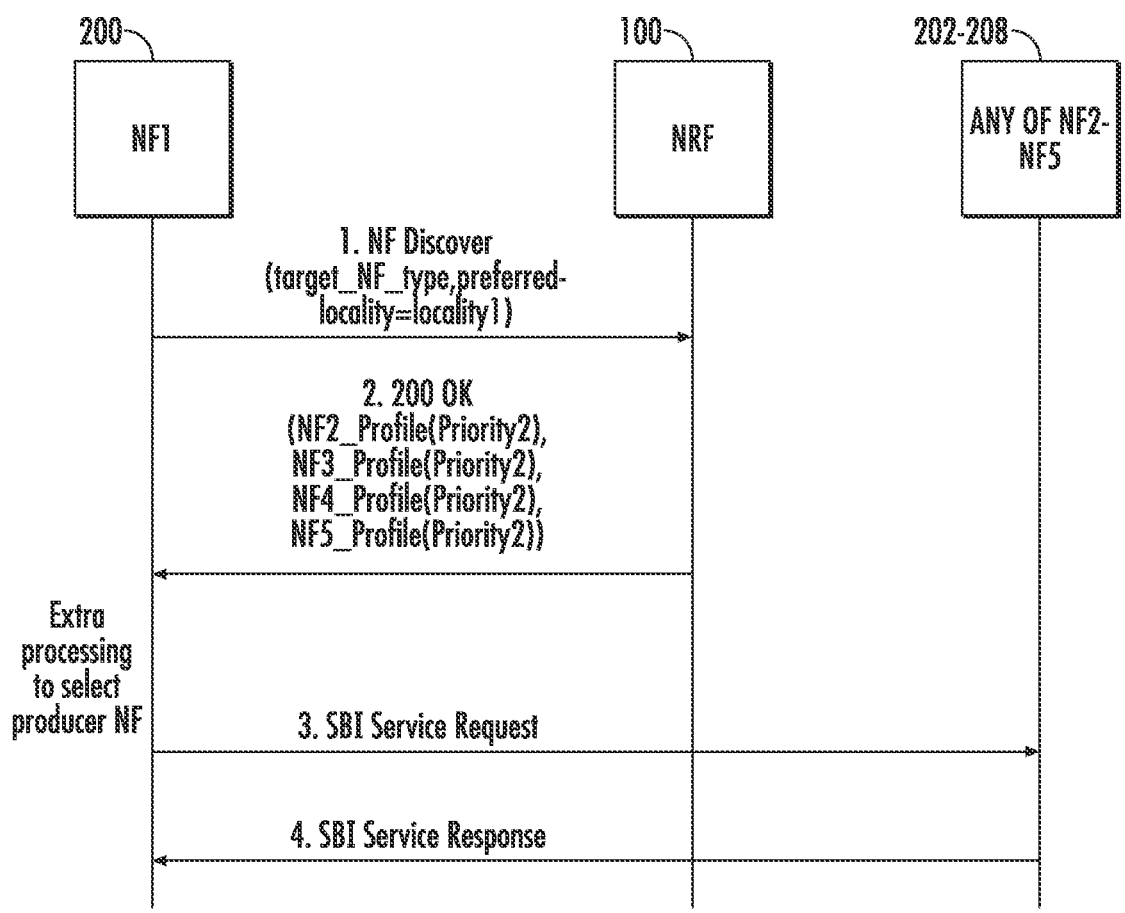
FIG. 6 is a message flow diagram illustrating exemplary messages exchanged for NF discovery and selection using a single preferred locality where no NFs in the preferred locality are available.

FIG. 5 illustrates the network of FIGS. 2 and 3 when NF6 210, which is the only producer NF in the preferred locality of NF1 200, becomes unavailable. FIG. 6 illustrates the corresponding message flow for NF discovery and selection when consumer NF1 200 specifies a single preferred locality and there are no NFs with a locality that matches the consumer NF's preferred locality. Referring to FIG. 6, in line 1, consumer NF1 200 sends an NF discover message to NRF 100. The NF discover message specifies a target NF type and a preferred locality of locality1. In response to the NF discover message, NRF 100 does not locate any NF profiles matching the preferred locality. However, NRF 100 may locate other NF profiles that are capable of providing the service but may be unable to set relative locality priorities of the remaining NF profiles that do not match the preferred locality because NRF 100 does not know the consumer NF's relative preferences of the other localities. Accordingly, in line 2, NRF 100 returns a 200 OK message with the NF profiles of NF2-NF5, all with the same priority, because none match the preferred locality of consumer NF1 200.

Consumer NF1 200 receives the discovery response and may be required to parse through large numbers of non-preferred producer NF profiles to select an optimal producer NF to provide a service. In line 3, consumer NF1 200 selects one of NF2-NF5 to provide the service and sends an SBI service request to the selected producer NF. In line 4, the selected producer NF returns an SBI service response message to consumer NF1 200. Thus, FIG. 6 illustrates the case where the specification of a single preferred locality results in extra processing of sub-optimal NF profiles on the part of the consumer NF to select a producer NF to provide a service.

Figure 7:
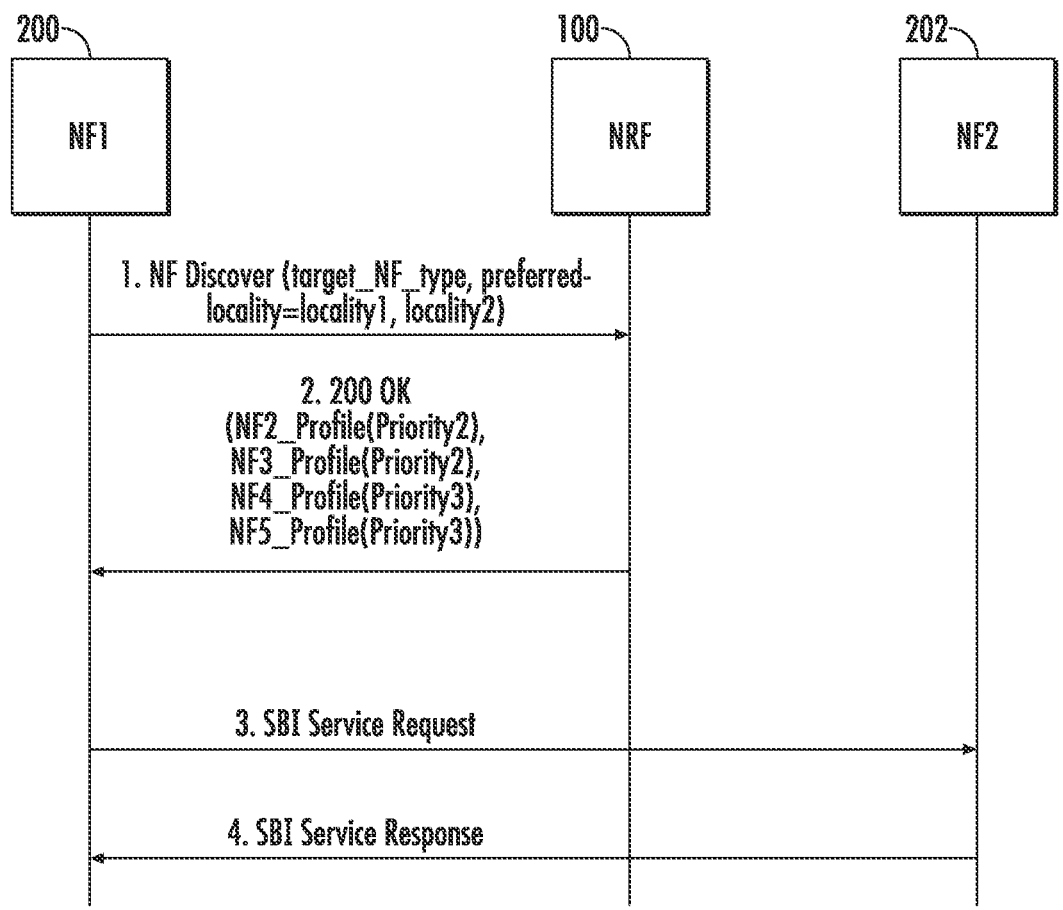
FIG. 7 is a message flow diagram illustrating exemplary messages exchanged for NF discovery and selection using a preferred-locality attribute with multiple preferred producer NF locations for the case of direct communication with non-delegated discovery.

To avoid this difficulty, the subject matter described herein includes enhancing the functionality of a consumer NF to specify multiple preferred localities in the NF discover message and enhancing the functionality of the NRF to select producer NF profiles that match any of the preferred localities and set priorities of producer NF profiles based on the preferred producer NF localities specified in the NF discovery request message. FIG. 7 is a message flow diagram illustrating the use of multiple preferred localities during the NF discovery and selection processes. Referring to FIG. 7, in line 1, consumer NF1 200 sends an NF discover message with the target NF type and a preferred-locality attribute that specifies two different preferred producer NF locations, locality1 and locality2. NRF 100 receives the NF discover message, and, in response, iterates through its NF registration database to identify NF profiles having an NF type attribute that matches the target NF type. From the NF profiles with matching NF type attributes, NRF 100 identifies NF profiles of producer NFs that have locality attributes that match any of the preferred producer NF locations indicated in the preferred-locality attribute. Table 3 shown below illustrates modifications of the process specified in 3GPP TS 29.510 to handle multiple preferred localities.

TABLE 3

Modified NRF Processing to Handle Multiple Preferred Localities

| Attribute Name | Data Type | P | Cardinality | Description | Applicability |
| --- | --- | --- | --- | --- | --- |
| Preferred-locality | string | O | 0 . . . <u>4N</u> | Preferred target NF location (e.g. geographic location, data center). When present, the NRF shall prefer NF profiles with a locality attribute that matches <u>with one of the locations identified in</u> the preferred-locality <u>attribute. E.g. location1 and locartion2, The NRF shall iterate through NF profiles that match the target NF type and set priorities of matching NF profiles based on whether or not the localities match any of the locations identified in the preferred-locality attribute.</u> The NRF may return additional NFs in the response not matching the preferred target NF location, e.g. if no NF profile is found matching <u>one of</u> the preferred target NF location<u>s</u>. The NRF should set a lower priority for any additional NFs on the response not matching <u>any of</u> the preferred target NF location<u>s</u> than those matching the preferred target NF location<u>s</u>. (NOTE 6) | |

In Table 3, the underlined portion indicates added text to the NRF processing defined in Table 2. From the added text in Table 3, rather than processing a preferred-locality attribute with a single preferred NF location, the NRF iterates through NF profiles that match the target NF type, identifies NF profiles that match with any of the locations specified in the preferred-locality attribute, and sets priority attributes of each NF profile based on whether the localities in the NF profiles match any of the locations identified in the preferred-locality attribute. In one example, NF profiles with a locality attribute matching any of the locations identified in the preferred-locality attribute may be assigned the same priority. In another example, the order of the locations in the preferred-locality attribute in the discovery request message may indicate a preference order of the locations, and the NRF may assign priorities to matching NF profiles based on the order in which locations are identified in the preferred-locality attribute (i.e., based on the relative preference of the locations set by the consumer NF). In 5G networks, a lower priority value indicates a higher preference (e.g., priority 0 indicates more preferred than priority 1). In the example illustrated in FIG. 7, locality1 is the most preferred locality, and locality2 is the next most preferred locality. However, in this example, there are no NFs available in locality1. Accordingly, in line 2, NRF 100 sets, in the discovery response the priorities of NF2 and NF3 to be higher (lower in priority value but more preferred) than those of NF4 and NF5, which do not have a locality that matches any of the preferred localities of consumer NF 200. In line 3 of the message flow diagram, NF1 200 selects NF2 202 based on the priorities in the discovery response and sends an SBI service request to NF2 202. In line 4, NF2 202 responds to the SBI service request with an SBI service response. Thus, FIG. 7 illustrates the use of localities in an NF discovery request to optimize NF discovery and subsequent NF selection.

Another change to the processing of the preferred-locality attribute indicated by Table 3 is the change in cardinality from 1 to N. That is, the current 3GPP specified cardinality of the preferred-locality attribute is 1, meaning that the attribute contains one preferred NF location. The proposed modification to the preferred-locality attribute changes the cardinality to N, where N is an integer greater than or equal to 1, meaning that the preferred-locality attribute can contain identifiers of plural preferred NF locations. In one implementation, the preferred-locality attribute contains strings that identify each preferred NF location, and the strings that identify different preferred NF locations are separated from each other by delimiters, such as commas.

In FIG. 7, if NF6 210 in locality1 had been available, then NRF 100 may return in the discovery response the NF profile of NF6 with priority 1, of NFs 2 and 3 with priority 2, and of NFs 4 and 5 with priority 3. The specification of relative priorities of producer NF profiles in the discovery response may reduce the processing burden on the consumer NF in selecting a producer NF to provide a service. In an alternate implementation of the subject matter described herein, if the NRF locates NF profiles matching any of the preferred localities specified in the discovery request, the NRF may return only those NF profiles, further reducing the processing burden on the consumer NF in performing NF selection.

If the NRF were configured in this manner, in the example in FIG. 7, only the NF profiles of NF2 and NF3 would be returned in the discovery response, and the NF profiles of NF4 and NF5 would be excluded from the discovery response.

In the example in FIG. 7, consumer NF1 200 performs NF discovery on its own behalf with NRF interaction but without SCP interaction. This type of discovery is referred to as direct communication with NRF interaction and corresponds to Model B in Annex E of 3GPP TS 23.501. In an alternate implementation, a consumer NF may perform indirect communications without delegated discovery, which corresponds to Model C in Annex E of 3GPP TS 23.501. According to Model C, consumer NFs perform NF discovery by querying the NRF. Based on the discovery result, the consumer NF selects an NF set (a group of NF instances identified by the same NF set ID and that provide the same service) or a specific NF instance in NF set. The consumer NF sends the SBI service request to the SCP containing the address of the selected service producer pointing to a NF service instance or a set of NF service instances. In the latter case, the SCP selects an NF service instance. If possible, the SCP interacts with the NRF to get selection parameters such as location, capacity, etc. The SCP routes the request to the selected NF service producer instance.

For the case in Model C where the consumer NF performs service discovery and selects an NF instance to which the service request is forwarded, the discovery request may include a preferred-locality attribute with multiple preferred producer NF locations, and the NRF operates as described above with respect to Table 3 to locate NF profiles with matching localities and set priorities of the NF profiles based on the matching localities. For the case in Model C where the consumer NF performs service discovery, selects an NF set, and forwards the SBI service request to the SCP, and the SCP interacts with the NRF to select a producer NF instance, the NRF may operate as described above with respect to Table 3 to return the NF profiles of NF sets that match any of the preferred producer NF locations specified in the preferred-locality attribute. The SCP may use the preferred localities of the consumer NF to select a producer NF instance from the NF set.

Figure 8:
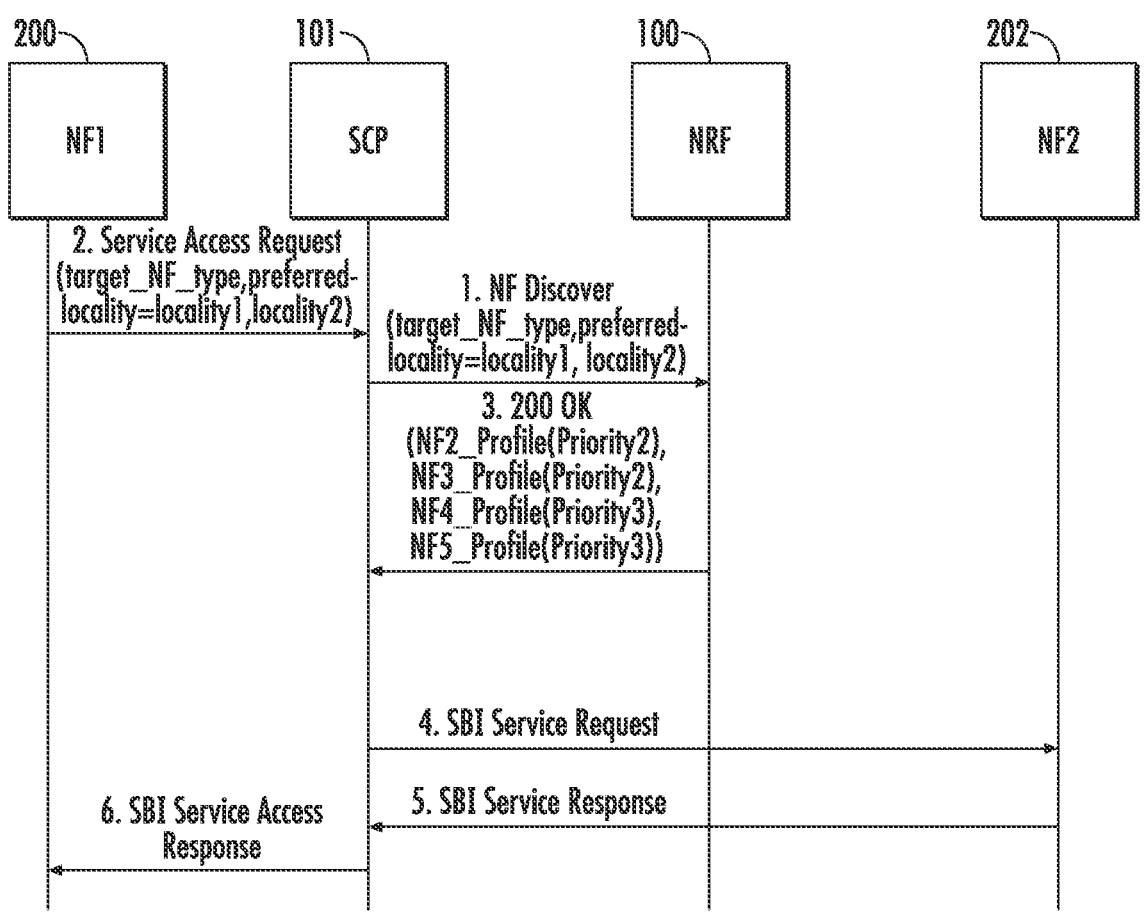
FIG. 8 is a message flow diagram illustrating exemplary messages exchanged for NF discovery and selection using a preferred-locality attribute with multiple preferred producer NF locations for the case of indirect communication with delegated discovery.

In yet another an alternate implementation, indirect communication with delegated discovery may be performed by an SCP on behalf of a consumer NF. Indirect communication with delegated discovery is referred to as Model D communication in Annex E of 3GPP TS 23.501. According to Model D, consumer NFs do not perform NF selection or discovery. Instead, the consumer NF adds necessary discovery and selection parameters to a service access request that is sent to the SCP. The SCP then performs discovery with an NRF, obtains a discovery response, selects a producer NF from the discovery response, and sends the SBI service request to the selected producer NF. Multiple preferred localities may be specified by the SCP in the discovery request. The use of multiple preferred localities for the case of indirect communication with delegated discovery is illustrated in FIG. 8. Referring to the message flow in FIG. 8, in line 1, consumer NF 200 sends an SBI service access request message with discovery and producer NF selection parameters to SCP 101. The discovery and producer NF selection parameters may include multiple preferred localities of consumer NF 200. In line 2, SCP 101 performs discovery with NRF 100 by sending a discovery request to NRF 100. The discovery request includes the preferred-locality attribute with multiple preferred producer NF locations received from consumer NF 200 in the service access request. In line 3 of the message flow diagram, NRF 100 processes the discovery request, searches its NF registration database using each of the preferred producer NF locations and returns a discovery response with NF profiles having priorities set according to the preferred producer NF locations. In the illustrated example, the NF profiles of NF2 202 and NF3 204 are returned with more preferred priorities than the NF profiles of NF4 206 and NF5 208. Again, in this example, it is assumed that NF6 210 is not available. In line 4 of the message flow diagram, SCP 101 sends an SBI service request to NF2 202, which was selected based on the preferred localities of consumer NF 200. In line 5, NF2 202 sends an SBI service response to SCP 101. In line 6, SCP 101 sends an SBI service access response to consumer NF 200. Thus, FIG. 8 illustrates the use of multiple preferred localities by an SCP for the case of indirect communications with delegated discovery.

Figure 9:
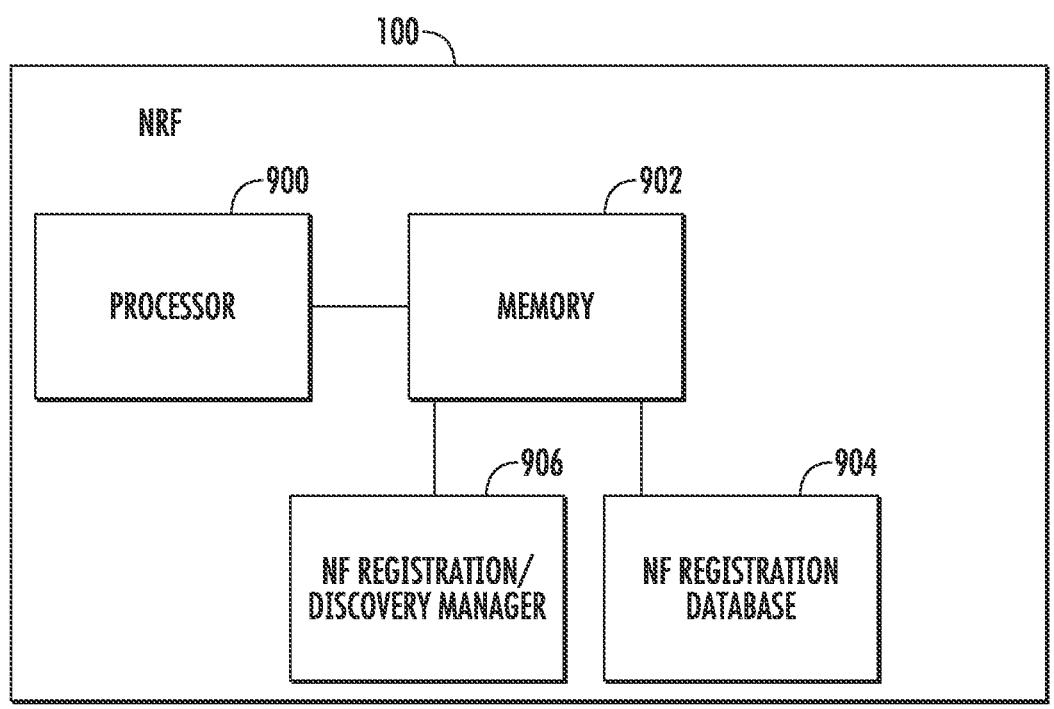
FIG. 9 is a block diagram illustrating an exemplary architecture for an NRF that supports plural preferred producer NF locations in a preferred-locality attribute for NF discovery.

FIG. 9 is a block diagram illustrating an exemplary architecture for NRF 100 to support multiple preferred localities in NF discovery. Referring to FIG. 9, NRF 100 includes at least one processor 900 and a memory 902. NRF

100 may also include an NF registration database 904 that stores the NF profiles of NFs that are registered with NRF 100. NRF 100 may further include an NF discovery/registration manager 906 registers NFs by receiving NF registration requests from the NFs and storing their NF profiles in NF registration database 904. NF discovery/registration manager 906 also receives discovery requests from consumer NFs and SCPs, where the discovery requests include multiple preferred localities, iterates through NF registration database 904 to select NF profiles matching any of the preferred localities, generates discovery responses with NF profiles having priorities set according to the preferred localities, and returns the discovery responses to the requesting consumer NFs or SCPs. In one example, NF discovery/registration manager 906 may be implemented using computer executable instructions stored in memory 902 and executed by processor 900.

Figure 10:
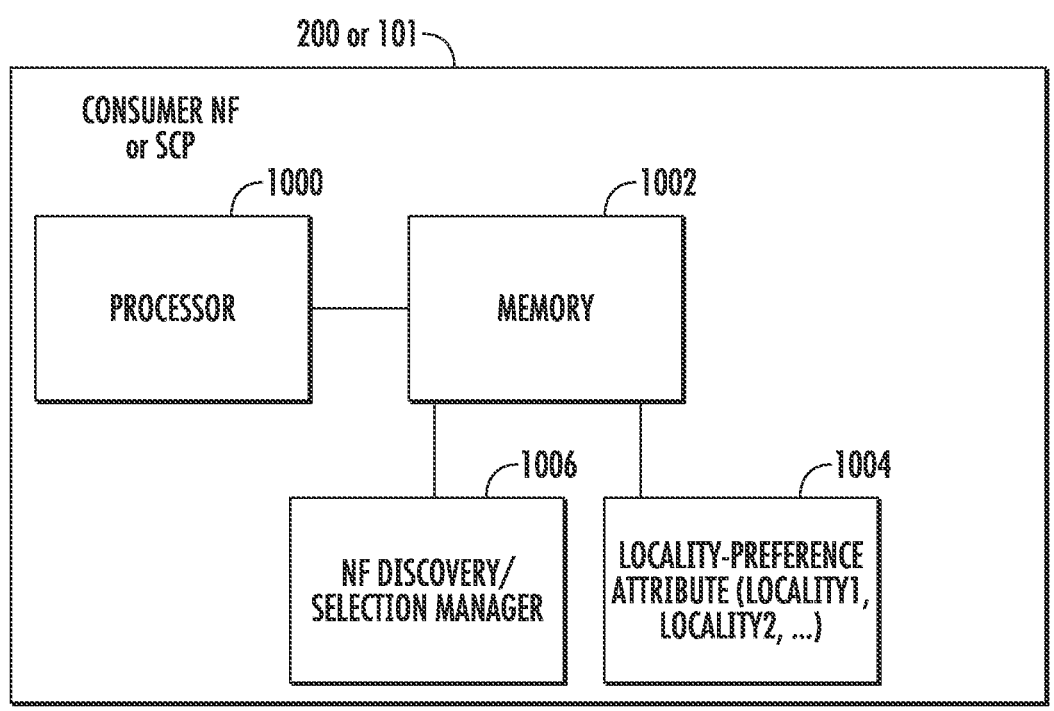
FIG. 10 is a block diagram of a consumer NF or SCP the supports NF discovery and selection using plural preferred producer NF locations in a preferred-locality attribute.

FIG. 10 is a block diagram illustrating an exemplary architecture of a consumer NF or SCP 200 or 101 capable of using multiple preferred localities in NF discovery and NF selection. In FIG. 10, consumer NF or SCP 200 or 101 includes a processor 1000 and a memory 1002. Consumer NF or SCP 200 or 101 includes a locality-preference attribute 1004 stored in memory 1002 that includes multiple preferred producer NF locations to be used in the NF discovery process. Consumer NF or SCP 200 or 101 further includes an NF discovery and selection manager for formulating discovery requests using locality-preference attribute 1004, for selecting an NF to provide a service from the NF profiles returned by the NRF based on the preferred NF locations, and for sending an SBI service request to the selected producer NF. In one implementation, NF discovery and selection manager may be implemented by computer executable instructions embodied in memory 1002 and executed by processor 1000.

Figure 11:
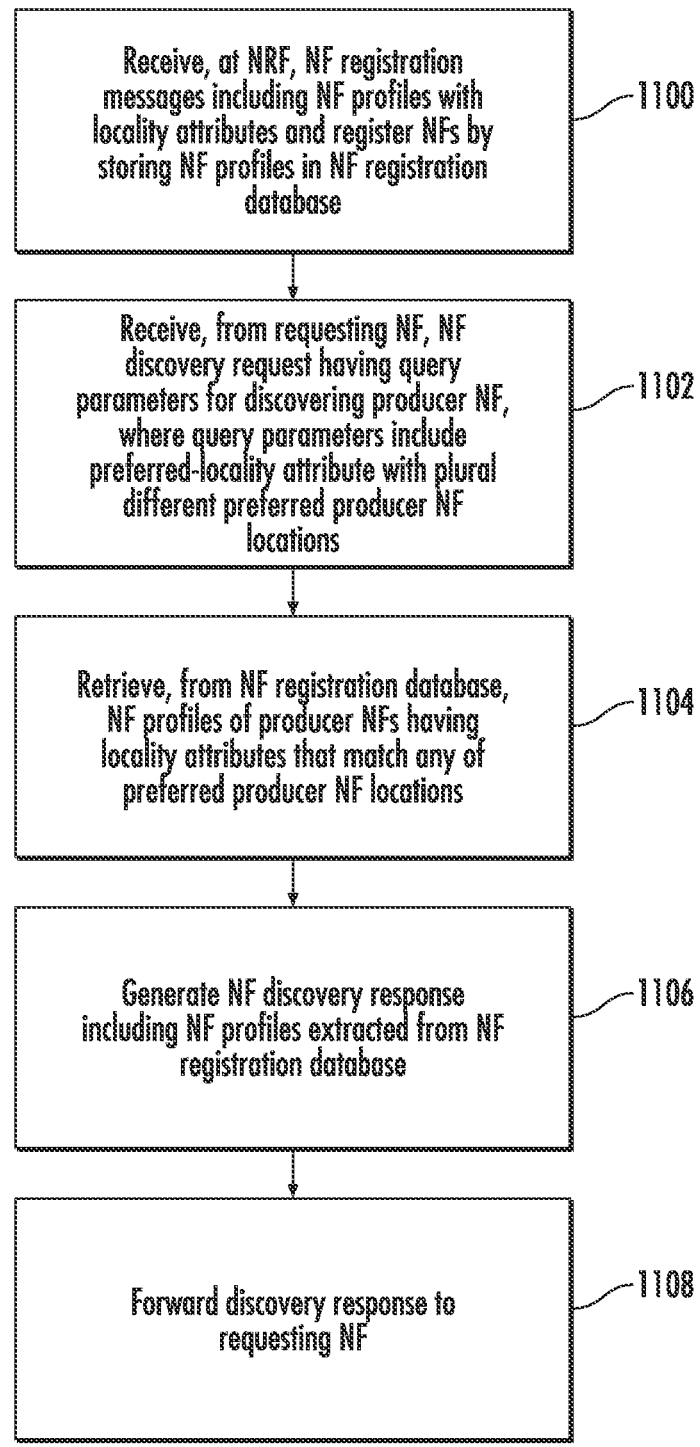
FIG. 11 is a flow chart illustrating an exemplary process for implementing NF discovery at an NRF using a preferred-locality attribute with plural preferred NF locations.

FIG. 11 is a flow chart illustrating an exemplary process performed by an NRF for supporting multiple locations in a preferred-locality attribute for network function (NF) discovery and selection. Referring to FIG. 11, in step 1100, the process includes, at an NF repository function (NRF) including at least one processor and a memory, receiving, from producer NFs, NF registration messages including NF profiles with locality attributes and registering the producer NFs by storing the NF profiles including the locality attributes in an NF registration database local to the NRF. For example, NRF 100 may receive registration messages from producer NFs that include NF profiles for the producer NFs. Each NF profile may include a locality attribute indicating a locality of the producer NF.

In step 1102, the process includes receiving, from a requesting NF, an NF discovery request having query parameters for discovering producer NFs, the query parameters including a preferred-locality attribute identifying a plurality of different preferred producer NF locations. For example, NRF 100 may receive a discovery request from a consumer NF or SCP with a locality attribute including multiple preferred producer NF locations. In one implementation, the discovery request may indicate the relative preferences on the part of the requesting NF of each of the preferred producer NF locations.

In step 1104, the process includes retrieving NF profiles from an NF registration database having locality attributes that match any of the preferred producer NF locations. For example, NRF 100 may search NF registration database 904 using the query parameters specified in the discovery request and initially locate NF profiles having an NF type attribute that matches the target NF type attribute specified in the discovery request. The NRF may identify, from the NF profiles having an NF type attribute that matches the target NF type specified in the discovery request, NF profiles that have a locality parameter that matches any of the preferred NF locations specified in the discovery requests. In one example, NRF 100 may extract the NF profiles having NF type attributes that match the target NF type and having locality attributes that match any of the preferred NF localities identified in the discovery request as well as NF profiles having NF type attributes that match the target NF type and having locality attributes that do not match any of the preferred NF localities identified in the discovery request. In such an implementation, NRF 100 may indicate, in the discovery response, relative preferences on the part of the consumer NF of the NF profiles having locality attributes that match one of the preferred NF locations and NF profiles having locality attributes that do not match one of the preferred NF locations. In an alternate implementation, NRF 100 may return in the discovery response only the NF profiles having an NF type attribute that matches the target NF type attribute in the discovery request and that have a locality that matches one of the preferred NF locations in the discovery request. In either implementation, NRF 100 may indicate relative preferences on the part of the consumer NF of the NF profiles having locality attributes that match one of the preferred NF locations identified in the discovery request.

In step 1106, the process includes generating an NF discovery response including the NF profiles retrieved from the NF registration database. As indicated in the preceding paragraph, the NF profiles returned in the response may include 1) those with locality attributes that match one of the preferred NF locations or 2) those with locality attributes that match one of the preferred NF locations and those with locality attributes that do not match one of the preferred NF locations. It should also be noted that if no NF profiles having a locality attribute that matches one of the preferred NF locations are located, then NRF 100 may return only the NF profiles with NF type attributes that match the target NF type and locality attributes that do not match any of the preferred NF locations. Relative priorities of the NF profiles returned in the response may optionally be indicated in any of the manners specified in the preceding paragraph. It should also be noted that NRF 100 may utilize the preferred NF locations received in the discovery request in combination with other query parameters in indicating relative priorities of NF profiles to be included in the discovery response.

In step 1108, the process includes forwarding the NF discovery response to the requesting NF. For example, if the requesting NF is a consumer NF performing non-delegated discovery, NRF 100 may return the discovery response to the requesting consumer NF. If the requesting NF is an SCP performing delegated discovery on behalf of a consumer NF, then NRF 100 may forward the NF discovery response to the SCP.

Figure 12:
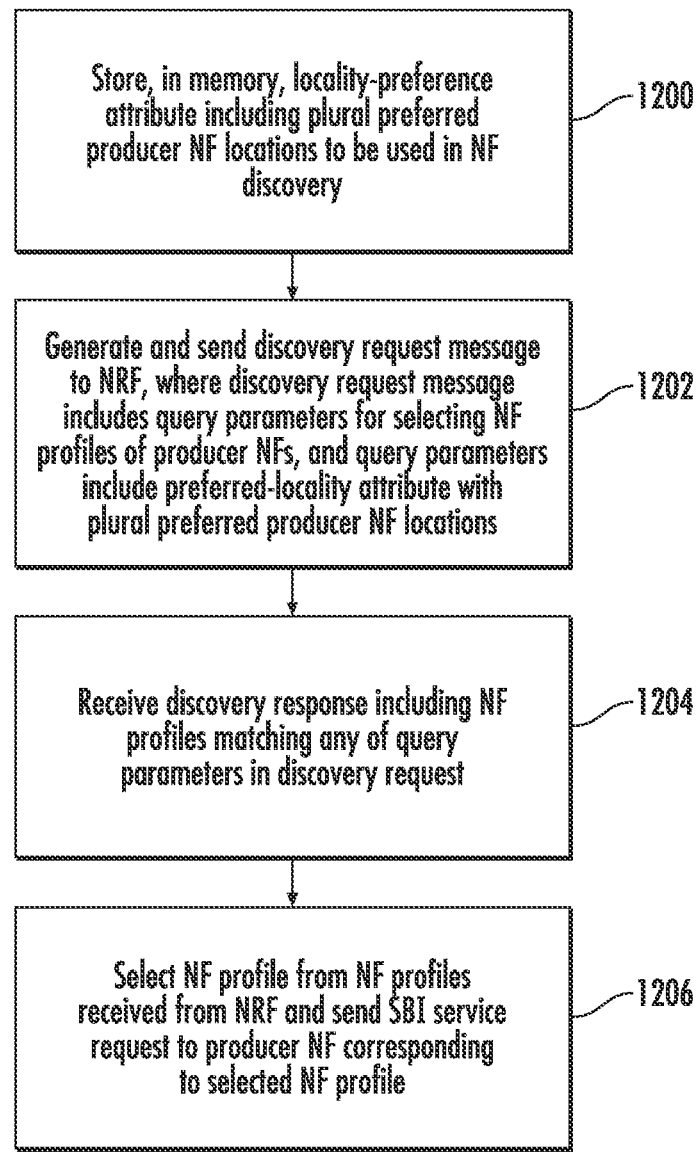
FIG. 12 is a flow chart illustrating an exemplary process performed by a consumer NF or SCP for performing NF discovery and selection using a preferred-locality attribute with plural preferred NF locations.

FIG. 12 is a flow chart illustrating an exemplary process performed by a consumer NF or SCP in supporting multiple locality profiles for NF discovery. Referring to FIG. 12, in step 1200, the process includes storing, in memory, a locality-preference attribute including plural preferred producer NF locations to be used in NF discovery. In the case of a consumer NF, the preferred-locality attribute may be populated with preferred locations of producer NFs that are configured by the network operator based on geographic proximity, messaging latency between the consumer NF and the producer NF locations, cost of accessing the producer NF locations, and/or other factor(s). In the case of an SCP, the preferred-locality attribute may be populated using preferred producer NF locations received from consumer NFs in SBI service access request messages. In the SCP case, the SCP may maintain different preferred-locality attributes for different consumer NFs so that the SCP can use the preferred-locality attributes on a per consumer NF basis for delegated discovery.

In step 1202, the process includes generating and sending a discovery request message to the NRF where the discovery request message includes a locality attribute identifying plural preferred NF locations. For example, consumer NF or SCP 200 or 101 may send an NF discover message to NRF 100, where the NF discover message includes query parameters for selecting producer NF profiles, and the query parameters include a preferred-locality attribute that identifies plural preferred NF locations. The discovery request also identifies the target NF type and may optionally identify the relative preferences of consumer NF 200 of the preferred producer NF locations identified in the preferred-locality attribute.

In step 1204, the process includes receiving a discovery response including NF profiles matching at least some of the query parameters in the discovery request. For example, consumer NF or SCP 200 or 101 may receive a discovery request from NRF 100 including NF profiles of producer NFs with attributes that match at least the target NF type and that match any of the preferred NF locations identified in the preferred-locality attribute in the discovery request.

In step 1206, the process includes selecting an NF profile from the NF profiles received from the NRF and sending an SBI service request to a producer NF corresponding to the selected NF profile. For example, consumer NF or SCP 200 or 101 may select, from the discovery response, an NF profile having a locality that matches one of the preferred NF locations indicated in the NF discovery request. If the discovery response indicates relative priorities of the NF profiles, consumer NF or SCP 200 or 101 may select the NF profile of the producer NF with the most preferred priority (lowest priority value). If the discovery response includes multiple NF profiles with the same priority, any suitable selection algorithm, including round robin selection, may be used.

Exemplary advantages of the subject matter described herein include enhanced NF discovery to efficiently select optimal producer NFs to provide service to a consumer NF, especially when the producer NF is not available in the same locality as the consumer NF. The preferred-locality attribute can be used in conjunction with other attributes, such as time of day, to benefit other use cases. The use of multiple preferred producer NF locations in the preferred-locality attribute in discovery requests provides for better control of NF discovery and more efficient discovery of producer NFs, especially in the case where there are no matches with the most preferred locality. The ability to indicate multiple preferred NF locations in the discovery request provides improved probability of finding or discovering NFs that are closer to the consumer NF.

The disclosure of each of the following references is hereby incorporated herein by reference in its entirety.

REFERENCES 1. 3GPP TS 23.501 V16.7.0 (2020-12); $3^{rd}$ Generation Partnership Project; Technical Specification Group Services and System Aspects; System architecture for the 5G System (5GS); Stage 2 (Release 16).
2. 3GPP TS 23.502 V16.7.1 (2021-01); 3rd Generation Partnership Project, Technical Specification Group Services and System Aspects; Procedures for the 5G System (5GS); Stage 2 (Release 16).
3. 3GPP TS 29.510 V17.0.0 (2020-12); 3rd Generation Partnership Project; Technical Specification Group Core Network and Terminals; 5G System; Network Function Repository Services; Stage 3 (Release 17).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for supporting multiple locations in a preferred-locality attribute for network function (NF) discovery and selection, the method comprising: at an NF repository function (NRF) including at least one processor and a memory:
    receiving, from producer NFs, NF registration messages including NF profiles with locality attributes and registering the producer NFs by storing the NF profiles including the locality attributes in an NF registration database local to the NRF;
    receiving, from a requesting NF, an NF discovery request having query parameters for discovering producer NFs, the query parameters including a preferred-locality attribute identifying a plurality of different preferred producer NF locations;
    retrieving NF profiles from the NF registration database having locality attributes that match any of the preferred producer NF locations;
    generating an NF discovery response including the NF profiles retrieved from the NF registration database; and
    forwarding the NF discovery response to the requesting NF.

2. The method of claim 1 wherein receiving the NF discovery request from a requesting NF includes receiving the NF discovery request from a consumer NF.

3. The method of claim 1 wherein receiving the NF discovery request from a requesting NF includes receiving the NF discovery request from a service communications proxy (SCP) performing delegated discovery on behalf of a consumer NF.

4. The method of claim 1 wherein receiving the NF discovery request includes receiving an NF discovery request that indicates relative preferences of the requesting NF of the preferred NF locations.

5. The method of claim 4 wherein generating the NF discovery response includes indicating, in the NF discovery response, relative preferences of the NF profiles based on the relative preferences indicated in the discovery request.

6. The method of claim 5 wherein indicating the relative preferences of the NF profiles includes one of:
    setting priority attributes of the NF profiles based on the relative preferences indicated in the discovery request; and
    ordering the NF profiles based on the relative preferences indicated in the discovery request.

7. The method of claim 1 comprising retrieving NF profiles from the NF registration database having attributes that match NF selection attributes in the discovery request but that do not have locality attributes that match any of the different preferred producer NF locations.

8. The method of claim 7 wherein generating the discovery response includes including, in the discovery response, the NF profiles in having attributes that match NF selection attributes in the discovery request but that do not have locality attributes that match any of the different preferred producer NF locations and indication that the NF profiles having locality attributes that match one of the preferred producer NF locations are more preferred than the NF profiles having attributes that match NF selection attributes in the discovery request but that do not have locality attributes that match any of the different preferred producer NF locations.

9. The method of claim 1 wherein generating the discovery response includes excluding, from the discovery response NF profiles that do not match any of the preferred producer NF locations.

10. The method of claim 1 comprising, at the requesting NF:
receiving the discovery response;
selecting one of the NF profiles having a locality attribute that matches one of the preferred NF locations; and
sending a service based interface (SBI) service request to a producer NF corresponding to the selected NF profile.

11. A system for supporting multiple locations in a preferred-locality attribute for network function (NF) discovery and selection, the system comprising:
an NF repository function (NRF) including at least one processor and a memory; and
an NF discovery/registration manager implemented by the at least one processor for:
receiving, from producer NFs, NF registration messages including NF profiles with locality attributes and registering the producer NFs by storing the NF profiles including the locality attributes in an NF registration database local to the NRF;
receiving, from a requesting NF, an NF discovery request having query parameters for discovering producer NFs, the query parameters including a preferred-locality attribute identifying a plurality of different preferred producer NF locations;
retrieving NF profiles from the NF registration database having locality attributes that match any of the preferred producer NF locations;
generating an NF discovery response including the NF profiles retrieved from the NF registration database; and
forwarding the NF discovery response to the requesting NF.

12. The system of claim 11 the requesting NF comprises a consumer NF.

13. The system of claim 11 wherein the requesting NF comprises a service communications proxy (SCP) performing delegated discovery on behalf of a consumer NF.

14. The system of claim 11 wherein the NF discovery request indicates relative preferences of the requesting NF of the preferred NF locations.

15. The system of claim 14 wherein, in generating the NF discovery response, the NF discovery/registration manager is configured to indicate, in the NF discovery response, relative preferences of the NF profiles based on the relative preferences indicated in the discovery request.

16. The system of claim 15 wherein the NF discovery/registration manager is configured to indicate the relative preferences of the NF profiles in the discovery response by one of:
setting priority attributes of the NF profiles based on the relative preferences indicated in the discovery request; and
ordering the NF profiles based on the relative preferences indicated in the discovery request.

17. The system of claim 11 wherein the NF discovery/registration manager is configured to retrieve NF profiles from the NF registration database having attributes that match NF selection attributes in the discovery request but that do not have locality attributes that match any of the different preferred producer NF locations.

18. The system of claim 17 wherein the NF discovery/registration manager is configured to include, in the discovery response, the NF having attributes that match NF selection attributes in the discovery request but that do not have locality attributes that match any of the different preferred producer NF locations and an indication that the NF profiles having locality attributes that match one of the preferred producer NF locations are more preferred than the NF profiles having attributes that match NF selection attributes in the discovery request but that do not have locality attributes that match any of the different preferred producer NF locations.

19. The system of claim 18 wherein the indication in the discovery response includes one of: priority attributes in the NF profiles; and an order of the NF profiles in the discovery response.

20. A non-transitory computer readable medium having stored thereon executable instructions that when executed by a processor of a computer control the computer to perform steps comprising:
receiving, from producer network functions (NFs), NF registration messages including NF profiles with locality attributes and registering the producer NFs by storing the NF profiles including the locality attributes in an NF registration database local to an NF repository function (NRF);
receiving, from a requesting NF, an NF discovery request having query parameters for discovering producer NFs, the query parameters including a preferred-locality attribute identifying a plurality of different preferred producer NF locations;
retrieving NF profiles from the NF registration database having locality attributes that match any of the preferred producer NF locations;
generating an NF discovery response including the NF profiles retrieved from the NF registration database; and
forwarding the NF discovery response to the requesting NF.

* * * * *